US011386479B1

(12) United States Patent
Gavini et al.

(10) Patent No.: US 11,386,479 B1
(45) Date of Patent: Jul. 12, 2022

(54) COMPUTER-READABLE STORAGE MEDIUM FOR PRESENTING OBJECT IDENTIFIERS FOR REAL WORLD OBJECTS ON WEARABLE AND PORTABLE DEVICES

(71) Applicant: Pinterest, Inc., San Francisco, CA (US)

(72) Inventors: Naveen Gavini, San Francisco, CA (US); Jason Luke Wilson, Mill Valley, CA (US); Evan Sharp, San Francisco, CA (US)

(73) Assignee: Pinterest, Inc., San Francisco, CA (US)

( * ) Notice: Subject to any disclaimer, the term of this patent is extended or adjusted under 35 U.S.C. 154(b) by 653 days.

(21) Appl. No.: 14/660,793

(22) Filed: Mar. 17, 2015

(51) Int. Cl.
   *G06Q 30/06* (2012.01)
   *H04W 4/02* (2018.01)

(52) U.S. Cl.
   CPC ........ *G06Q 30/0633* (2013.01); *H04W 4/023* (2013.01)

(58) Field of Classification Search
   CPC .... G06Q 30/06; G06Q 30/0633; H04W 4/023
   USPC ................................................ 705/26.1-27.2
   See application file for complete search history.

(56) References Cited

U.S. PATENT DOCUMENTS

| | | | | |
|---|---|---|---|---|
| 8,909,631 B1* | 12/2014 | Seth | ...................... | G06Q 30/02 707/724 |
| 2012/0278167 A1* | 11/2012 | Schwartz | ................ | H04M 3/02 705/14.53 |
| 2012/0295639 A1* | 11/2012 | Fitoussi | ................ | H04W 4/029 455/456.3 |
| 2014/0257747 A1* | 9/2014 | Repenning | ............ | H04W 4/022 702/150 |
| 2014/0342760 A1* | 11/2014 | Moldavsky | ........ | G06Q 30/0261 455/456.3 |
| 2015/0020081 A1* | 1/2015 | Cho | ........................ | G06F 9/542 719/318 |
| 2015/0061862 A1* | 3/2015 | Lee | ...................... | H04M 1/7253 340/539.11 |

OTHER PUBLICATIONS

Average consumer has downloaded three shopping-related apps: Significant consumer adoption of web-enabled phones began in 2007. (May 26, 2011). PR Newswire Retrieved from https://dialog.proquest.com/professional/docview/868683628?accountid=131444.*

* cited by examiner

*Primary Examiner* — Jeffrey A. Smith
*Assistant Examiner* — Jennifer V Lee
(74) *Attorney, Agent, or Firm* — Athorus, PLLC

(57) ABSTRACT

This application describes a system and process for providing object identifiers relating to real world objects to users based on the location of the user and the anticipated interested of the user in an object within a defined distance of the user. For example, if the user is within a retail store, a portable device associated with the user may detect or receive a beacon transmitted from a location within the retail store and object identifiers representative of objects within the store may be generated and provided to the user. In some implementations, only object identifier representative of items determined to be of likely interest to the user may be provided for presentation to the user.

13 Claims, 14 Drawing Sheets

US 11,386,479 B1

COMPUTER-READABLE STORAGE MEDIUM FOR PRESENTING OBJECT IDENTIFIERS FOR REAL WORLD OBJECTS ON WEARABLE AND PORTABLE DEVICES

BACKGROUND

People are increasingly interacting with computers and other electronic devices in new and interesting ways. With the increased processing capabilities, connectivity and location tracking, electronic devices have become widespread and used in many everyday activities. For example, people often use electronic devices to search for products, watch videos, listen to music, research, shop for both digital and physical products ("e-commerce"), and receive news, just to name a few. Other uses include communicating with social communities, friends and family, photography, and many others.

Objects are typically made available and people search for objects, based on information about the object for which they are searching. Key words that describe an object are often associated with the object and, when people search using one or more of those key words, the object may be returned as a result. While this provides a good foundation for searching for objects based on information about the object, it limits the ability for individuals to search for, share, and experience objects in other ways.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

Figure 1:
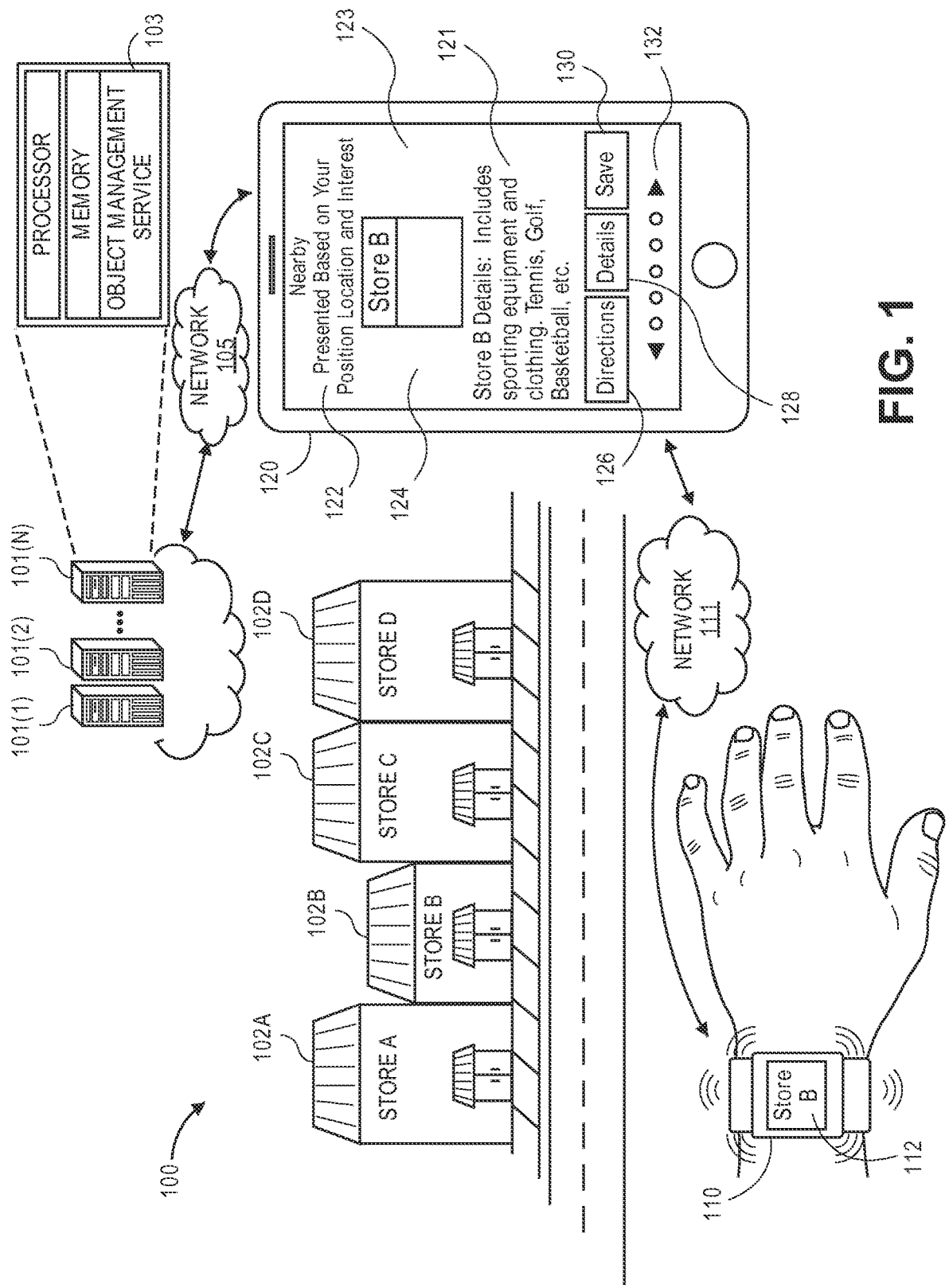
FIG. 1 is an illustration of an environment and a user receiving a notification related to an object in the environment, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This application describes a system and process for providing object identifiers relating to real world objects to users based on the position of the user and the anticipated interest of the user in an object within a defined distance of the user. For example, if the user is within a retail store, a portable device associated with the user may detect or receive a beacon transmitted from within the retail store. The beacon may include an identifier that the portable device sends to a remote computing resource and the remote computing resource may identify one or more objects and/or object identifiers associated with the beacon. The beacon may correspond with the environment (e.g., the retail store) in which the user is positioned, a location within the environment (e.g., a department within the retail store—men's clothing, women's clothing, shoes, toys), or one or more items within the environment (e.g., shoes, clothing, toys). An environment, a location, and items are generally referred to herein as "objects." An object is anything that can be represented. For example, an object identifier represents objects such as, but not limited to, television shows, movies, songs, images, physical objects, locations, sounds, web pages, digital objects, other object identifiers, etc.

The remote computing resource may also determine based on a user profile associated with the user whether the user is likely interested in the object or object identifier associated with the beacon. If it is determined that the user is likely interested in the object or the object identifier associated with the beacon, the object identifier or an object identifier representative of the object is sent to the portable device for presentation to the user. In other implementations, as discussed below, the remote computing resource may automatically provide the object identifier associated with the beacon and the application operating on the portable device may determine the anticipated interest of the user and whether the object identifier is to be presented to the user.

An "object identifier," as used herein, is a collection of one or more items of information about an object. The object identifier may include any combination of: a representation for the object, such as a graphical representation, audible representation, or other representation of the object; a description of the object; static information about the object; supplemental information about the object; the source of the object; etc. In some implementations, an object identifier may represent multiple objects and/or represent multiple other object identifiers. For example, a first object identifier may be associated with and represent three other object identifiers (a second object identifier, a third object identifier, and a fourth object identifier). The second object identifier may be associated with and represent a first item, such as a shirt. The third object identifier may be associated with and represent a second item, such as a pair of shorts. The fourth object identifier may be associated with and represent a third item, such as a pair of shoes. The three items may be part of an outfit or correspond to a theme that is being promoted. As such, the first object identifier may be used to represent the outfit or theme by representing the three object identifiers for those objects.

As will be appreciated, additional or fewer items of information may be included in an object identifier. Likewise, additional or fewer objects and/or object identifiers may be represented by an object identifier.

Static information about an object may be any information about the object that does not change. Static information may be provided by a first entity, such as a manufacturer, owner, creator of the represented object, or other authoritative source relating to the object. Supplemental information, as used herein, may be any additional information that may be associated with a representation of an object represented by the object identifier and/or the object identifier. In some implementations, supplemental information may be periodically updated by external sources, and/or include actions that may be performed by users interacting with the object identifier. For example, supplemental information may include seller reviews and/or user reviews relating to the object represented by the object identifier. As another example, supplemental information may include sizing options for an item represented by the object identifier, color options for the object, price, quantity remaining in stock, etc. When a user views the object identifier, the supplemental information may be automatically updated to present to the user with current information relating to the object represented by the object identifier.

If the supplemental information is an action, such as a link to an external source, a buy button, etc., a user may interact with the object identifier and have the action performed. For example, if the supplemental information is a buy button, the user can interact with the buy button and initiate the action of buying the object identified by the object identifier. Supplemental information associated with an object identifier may be provided by one or multiple sources. For example, if the object identified by an object identifier is a shoe that is being sold by a retailer, the supplemental information may be provided by the retailer.

FIG. 1 is an illustration of an environment 100 and a user receiving a notification related to an object in the environment, according to an implementation. In this example, the environment 100 in which the user is positioned is an outdoor environment near a plurality of physical retail stores 102. In this example the user is near four stores—Store A 102A, Store B 102B, Store C 102C, and Store D 102D. The portable device 120 associated with the user may determine its position based on, for example, received Global Positioning System (GPS) information, indoor location services, triangulation from cellular towers or other wireless transmitters, based on Wi-Fi network connections, etc., and/or receive a beacon representative of one of the objects (e.g., store) within the environment, a location within the environment, or the environment.

A beacon, as used herein, may include a wireless signal carrying identifiable information that is transmitted by or from one of the objects. For example, a beacon may be a radio frequency identifier (RFID) signal transmitted by a RFID tag, a Bluetooth signal, an iBeacon, an AltBeacon, etc. Likewise, the beacon may be an audible signal generated in the environment and/or an image of at least a portion of the environment, the location, or an object that is obtained by the portable device.

The position of the portable device and/or the received beacon, along with a portable device identifier and/or a user identifier of the user of the portable device, may be sent over a network 105 to computing resources 101 for processing by an object management service 103. The network 105 may include a local area network, a wide area network, such as a public switched telephone network (PSTN), a cable television network, a satellite network, a collection of networks, a public Internet protocol network, a private Internet protocol network, or a combination thereof. Moreover, the network 105 may be wireless or a combination of wireless and wired. The computing resources 101 may include one or more server computers 101(1), 101(2)-101(N). As will be appreciated, any number and/or type of computing resources 101 may be used. Likewise, the computing resource may be local to the environment in which the user is positioned, remote from the environment, or any combination thereof. An example server computer is discussed further below with respect to FIG. 15.

The object management service 103 maintains an association between beacons and/or position information and corresponding object identifiers. For example, the identifiable information received from a beacon may include a unique identifier. The object management service 103 may maintain in a data store an association between the unique identifier and one or more object identifiers. As another example, object identifiers may be associated with position information, such as a range of geographic areas or positions.

Likewise, the object management service 103 may also maintain user profiles for users that identifies information about users. The user profiles may identify, for example, user interests (inferred and/or specified by the user), past purchase history of users, past browse history of users, an identification of items viewed and/or selected by the user, object identifiers previously viewed, saved, and/or shared by the user, etc.

Utilizing the received beacon or position information, the object management service may identify the one or more object identifiers associated with the beacon or near the position of the user. Likewise, the object management service 103, using the unique identifier of the portable device and/or the user identifier received from the portable device, may identify the user profile for the user. A determination is then made as to an anticipated interest level of the user in the object represented by the one or more object identifiers.

Returning to FIG. 1, the portable device 120 may periodically provide position information to the object management service 103 and the object management service 103 may determine if there is an object within the environment where the user is positioned that has an anticipated interest for the user. In this example, the object management service 103 determines that a high anticipated interest from the user exists with respect to Store B 102B. In this example, based on the position information received from the portable device 120, the object management service has determined that the user is near objects 102A-102D and determined the object identifiers for each of those objects.

Likewise, based on the user profile associated with the user, the object management service 103 has determined that the user has a high interest in, among other things, tennis equipment and tennis clothing. Comparing the determined interest of the user with the information associated with each determined object identifier, the object management service 103 determines an anticipated interest for the user with respect to each object.

In this example, Store A 102A is a pet store, Store B 102B is a sports store, Store C 102C is a jewelry store, and Store D 102D is a fabric store. Based on the user profile of the user, the object management service determines that the user has a low anticipated interest in each of Store A 102A, Store C 102C, and Store D 102D, but has a high anticipated interest in Store B. Specifically, in this example, the user profile identifies that the user has an interest in tennis equipment and tennis clothing and, based on the information associated with the object identifier, Store B includes a tennis section (location) that includes tennis related items.

Based on this high anticipated interest, the object management service 103 sends the object identifier representative of the object Store B 102B to the portable device 120. Likewise, in this example, the high anticipated interest level or an identification that it has been determined the user has a high interest in the object Store B 102B is also provided to the portable device.

The portable device, upon receiving the object identifier and the indication of the high anticipated interest, sends a notification to the wearable device 110 associated with the user, via a network 111, for presentation to the user by the wearable device 110. The network 111 may be any type of wireless network including, but not limited to, Bluetooth, Wi-Fi, near field communication ("NFC"), etc.

Based on user specified preferences, the notification may be sent to the wearable device only for objects that are determined to be of a high anticipated interest. In other implementations, the user may specify what types of notifications are to be sent to the portable device. Likewise, while this example illustrates that the object management service 103 provides the anticipated interest level or an identification of the anticipated interest level, in other implementations, the object management service 103 may provide an indication to the portable device as to whether a notification is to be provided to the wearable device 110. In still another example, the object management service 103 may provide the notification to the portable device 120 and/or directly to the wearable device 110.

The wearable device 110, upon receiving a notification, presents the notification 112 to the user. The notification may be presented audibly, visually, using haptics to physically notify the user, and/or any combination thereof. Likewise, in some implementations, depending on user preference and the anticipated interest level, different forms of presentation may be utilized by the wearable device. For example, if the user has actively identified objects for which the user would like to be notified, the presentation of a notification for such an object may be provided in the form of audio, visual and haptics. Notifications for objects that are determined to be of high interest, but not affirmatively indicated by the user to be of interest, may only be provided using one form of presentation. In other implementations, the presentation forms may be progressive. For example, the notification may initially be presented using haptics and/or audio. If the user moves the wearable device into a position in which the user can view the display on the wearable device, the presentation may be presented visually.

The visual presentation of the notification 112 on the wearable device 110 may provide initial information to the user identifying the object, in this example Store B 102B. The initial information identifies, for example, the object (e.g., Store B) and/or information about the object and/or why the user is being notified. For example, the notification may identify to the user that Store B 102B includes tennis items.

If the user shows an interest in the object and/or the notification, such as by viewing the notification on the wearable device for a defined period of time (e.g., three seconds) and/or interacts with the notification 112 on the wearable device 110, the object identifier may then be presented on the portable device 120. For example, if the user shows an interest in the notification, the wearable device 110 may send an alert or message to the portable device 120, via the network 111, indicating that the portable device 120 is to present the object identifier 123 on a display of the portable device 120. Alternatively, if the user does not interact with the wearable device 110, or does not have a wearable device 110, a notification is not sent to the wearable device 110, and the object identifier may be presented on the display of the portable device if the user interacts with the portable device 120. In some implementations, the object identifier may be presented on the wearable device 110.

In some implementations, in addition to or as an alternative to sending a notification for presentation on a wearable device, the notification may be presented by the portable device 120. For example, like the wearable device 110, the portable device 120 may provide a visual notification, an audible notification, a haptic notification, and/or any combination thereof.

The presentation of the object identifier 123 on the portable device 120 provides additional information about the object and/or why the object identifier is being presented to the user. For example, a presentation identifier 122 identifying why the object identifier is being presented to the user may be included in the object identifier 123. In this example, the presentation identifier 122 indicates that the object identifier 123 corresponds to an object that is near the user's position and based on the interests of the user.

The object identifier 123 includes information about the object and one or more action buttons. For example, the object identifier 123 may include a graphical representation 124 of the object and/or textual information 121 about the object. The graphical representation 124 and/or textual information 121 are examples of supplemental information that may be included with an object identifier by an external source, such as an owner of Store B 102B.

In this example, the action buttons include a Directions action button 126, a Details action button 128, and a Save action button 130. Selection of the Directions action button 126 will cause the action of providing directions to the user directing the user to the position of the object (Store B) to be performed. The directions may be provided on the portable device 120, the wearable device 110, or using other forms of communication. Selection of the Details action button 128 will cause the action of providing additional details to the user about the object represented by the object identifier 123 to be performed. Additional details may include, for example, the store address, store hours, items sold, web site, sales, and/or any other static or supplemental information associated with the object identifier. In some implementations, the details may be selected and presented to the user based on the determined interests of the user. Selection of the Save action button 130 will cause the action of saving or associating the object identifier with the user's profile.

While this example illustrates the presented object identifier with three action buttons, in other implementations, more, fewer and/or other action buttons may be presented. An action button may be any graphical representation of an action that may be performed with respect to the object represented by the object identifier and/or the object identifier. Other examples of action buttons may include a Buy action button, Share action button, Not interested action button, etc.

In some implementations, if the object management service 103 determines that more than one object in the environment is anticipated to be of interest to the user, additional object identifiers and/or notifications may be sent to the portable device 120 for presentation to the user. A user may view other object identifiers by selecting the scroll arrows 132 and/or by otherwise interacting with the portable device, for example, by swiping their finger horizontally across the display of the portable device.

In some implementations, different object identifiers for an object may be presented to the user based on the position of the user with respect to the object. For example, as discussed above, the user was in an environment that included several objects (Store A, Store B, Store C, Store D), and it was determined to present an object identifier representative of Store B 102B to the user to notify the user that the object Store B 102B was near the position of the user. The environment may be a defined distance around the user, such as one mile. Any defined distance may be utilized to determine the environment. In other implementations, the environment may not be a specifically defined distance but may be defined based on an object (building) in which the user is positioned. For example, if the user is located outside, the environment may be a defined distance around the user. However, if the user is located indoors, the environment may be the interior of the building or a section of the interior of the building. For example, if the user is in a shopping mall with many stores (each an object), when the user is positioned in a common area of the shopping mall the environment is the shopping mall and the objects are the stores. If the user enters a store, the environment becomes the store in which they are positioned and the objects are locations and/or items within the store.

In some implementations, as a user nears an object (e.g., Store B), additional and/or different object identifiers may be presented. For example, if the user is within a second defined distance (e.g., thirty feet) of an object within the environment, an object identifier may be presented to the user that is different than the object identifier for the object that is presented as discussed above with respect to FIG. 1. For purposes of this discussion, when a user is within a second defined distance of an object, the user is considered to be positioned at the location of the object. As mentioned above, the object may be a physical item or the location.

Figure 2:
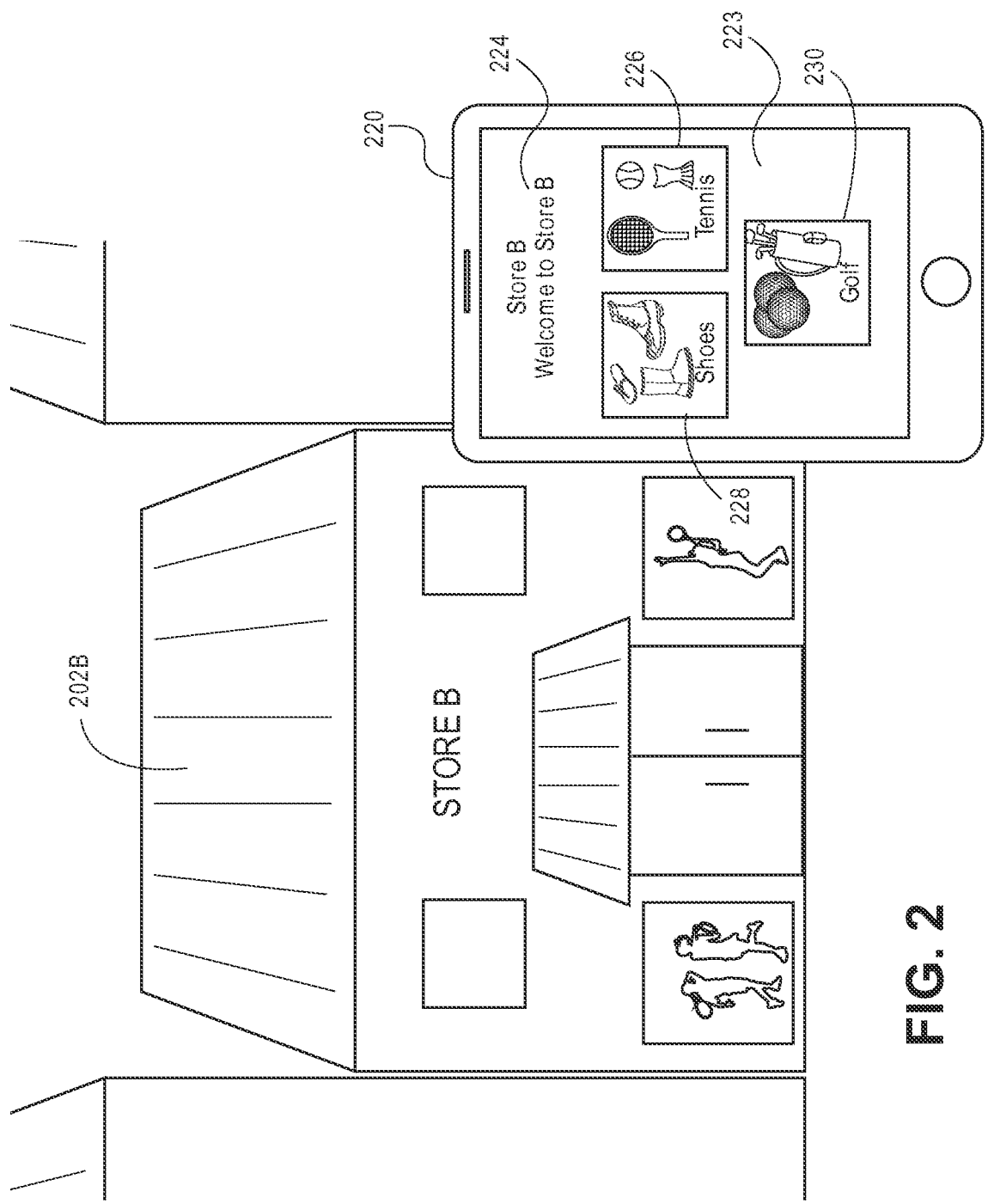
FIG. 2 illustrates an example of an object identifier that is presented to the user when the user is positioned at the location of an object anticipated to be of interest to the user, according to an implementation.

FIG. 2 illustrates an example of an object identifier that is presented to the user when the user is positioned at the location of an object anticipated to be of interest to the user, according to an implementation. In this example, the user is now positioned within a defined distance of object Store B 202B. As discussed above, the position of the user may be determined by the object management service 103 (FIG. 1) based on position information (e.g., GPS) provided by the portable device 220 to the object management service 103 and/or based on beacon information received from an object by the portable device 220 and provided to the object management service 103.

When it is determined that the user is positioned at the location of the object, an object identifier 223 associated with the object Store B 202B is provided to the portable device 220 for presentation to the user. In this example, the object identifier 223 includes a presentation identifier 224 that identifies the object and also includes other information related to the object. Like the other object identifiers, the object identifier 223 may include information that is determined to be of likely interest to the user. In this example, the object identifier 223 includes representations of other object identifiers that are associated with objects within Store B that are anticipated to be of interest to the user based on the objects associated with Store B and the user profile associated with the user. Specifically, object identifier 223 includes a graphical representation representative of object identifiers that are associated with Shoes 228, a graphical representation representative of object identifiers that are associated with Tennis 226, and a graphical representation representative of object identifiers that are associated with Golf 230.

The user may interact with the object identifier 223 to obtain additional information about the object and/or interact with any of the graphical representations 226, 228, 230 included in the object identifier. For example, the user may interact with the object identifier 223 to obtain additional static information and/or supplemental information about the object Store B 202B. Such information may include an identification of other items or categories of items associated with Store B, sales promotions, hours, and/or any other information associated with the object identifier 220.

Likewise, the user may interact with any one or more of the graphical representations 228, 226, 230 to obtain additional information about the items associated with the graphical representation. For example, the user may select the Shoes 228 graphical representation and receive from the object management service 103 object identifiers representative of shoes associated with Store B 202B that are determined to have a high anticipated interest to the user. Similarly, selection of the Tennis 226 graphical representation will result in the user being presented with object identifiers for tennis related items (e.g., tennis clothing, tennis equipment, tennis themes) associated with the object Store B 202B. Selection of the Golf 230 graphical representation will result in the user receiving object identifiers for golf related items (e.g., golf clothing, golf equipment, golf themes) associated with the object Store B 202B.

While this example illustrates an object identifier 223 that is representative of other object identifiers representative of items associated with the object Store B 202B, in other implementations, the object identifier 223 presented when the user is determined to be positioned at the location of the object Store B 202B may include less, additional and/or different information. Likewise, while this example illustrates the object management service 103 providing the object identifier 223 to the portable device 220 when it is determined that the user is positioned at the location of the object, in other implementations, the object identifier 223 may be provided at other times and the portable device may determine when/if to present the object identifier to the user. For example, the object identifier 223 may be provided to the portable device when it is initially determined that the user and the object are in the same environment (e.g., within a first defined distance of each other) and/or when the user indicates an interest in the object but before the user is positioned at the location of the object. In such an example, the portable device 220 may determine when the user is positioned at the location of the object and determine to present the object identifier 223 to the user.

In some implementations, the object management service 103 may determine whether to present object identifiers and/or notifications to a user based on the environment in which the user is located. For example, if the environment in which the user is located is often frequented by the user (e.g., part of the user's commute route to and/or from work), the object management service 103 may determine not to present detected object identifiers because the user is likely aware of those objects within the environment. However, if a new object and/or object identifier that is determined to be of anticipated interest to the user is detected within the environment, the new object identifier may be presented to the user. In comparison, if the user is positioned in an environment that is new to the user, the user has not been in the environment recently, and/or the user has only been in the environment a limited number of times, object identifiers corresponding to objects determined to be of anticipated interest to the user may be presented to the user, as discussed herein.

Figure 3:
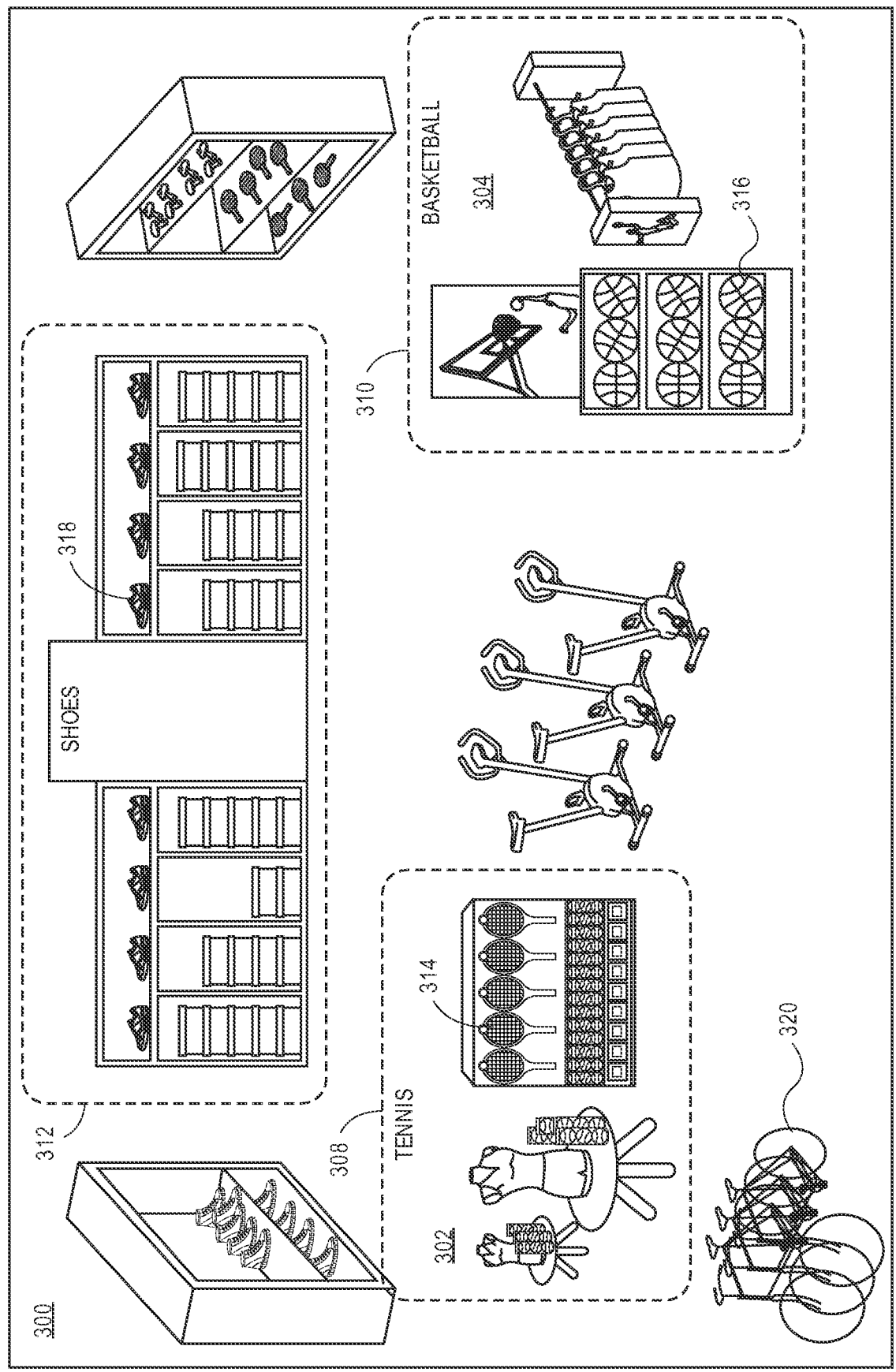
FIG. 3 is an illustration of an environment, according to an implementation.

FIG. 3 is an illustration of an environment 300 within the object Store B 202B (FIG. 2), according to an implementation. As discussed above, the environment may change depending on the position of the user. In the examples discussed above with respect to FIGS. 1-2, the environment was outside and the objects included the stores located in the environment (e.g., within a defined distance of the user). In FIG. 3, the user has moved inside the object Store B 202B (FIG. 2) and the environment 300 has changed such that it is now the inside of Store B. Within the environment 300 there are locations 308, 310, 312, each location an object. Likewise, there are items within the environment 300, such as tennis racquets 314, basketballs 316, shoes 318, each of which may be positioned within a location. There may also be other items within the environment 300, such as bicycles 320, that are not positioned within a location within the environment.

For each location and/or item within the environment 300, there may be one or more object identifiers maintained by the object management service that are presentable to the user via a portable device, a wearable device and/or using one or more output components within the environment 300. In some implementations, each location may be associated with a beacon, such as an iBeacon, that is transmitted from a source positioned within the location. Alternatively, or in addition thereto, the location may be associated coordinates (such as indoor positioning information). In either example, the inventory management service maintains information for each location, such as types of items within the location, item inventory, themes, prices, sales, etc. When a user is positioned within the location (e.g., within a defined distance of the source of the beacon or within a defined distance of the coordinates associated with the location), the inventory management service may determine whether to send object identifiers to the portable device associated with the user that are related to the location and/or items within the location.

Figure 4:
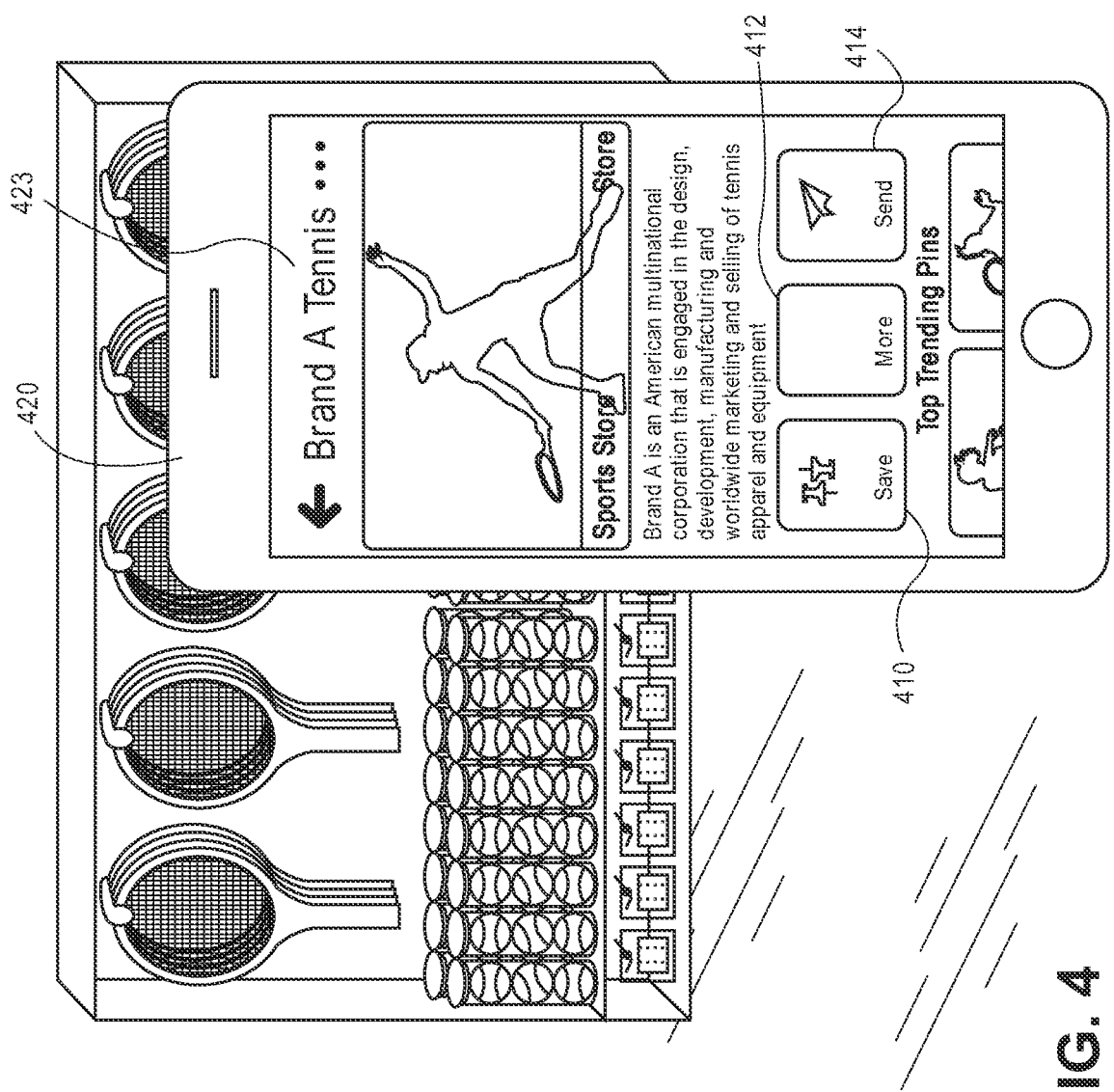
FIG. 4 is an illustration of a location and a user receiving an object identifier related to the location, according to an implementation.
Figure 4:
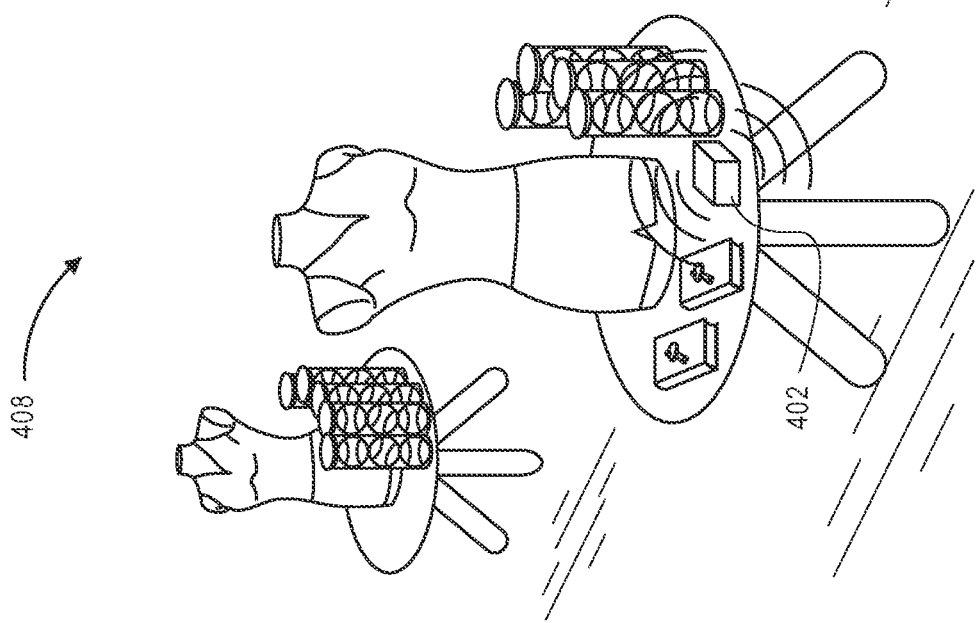

For example, referring to FIG. 4, illustrated is the location 408 defined for tennis. In this example, the location 408 is defined as an area around a source 402 of a beacon. The source 402 of the beacon may be positioned anywhere and the location may be defined as a region or area within a defined distance of the source 402 of the beacon (e.g., thirty feet). As will be appreciated, different locations within the environment may be different sizes and/or may be defined by more than one source beacon. For example, a large location may include two or more sources that generate a same or similar beacon that is used to define the location.

In some implementations, a size and/or shape of a location may be defined based on a distance surrounding a beacon, which may be determined based on information received from the beacon and/or the strength of the signal received from the beacon. For example, a size and shape of a location may be defined as a fifteen foot radius around a beacon source. In other implementations, the size and/or shape of a location may be determined based on GPS coordinates and a defined position mapping (e.g., geo-fencing) around the location. In still another implementation, a location may be defined as any area in which a signal from a beacon is detectable. It will be appreciated that a variety of techniques may be utilized to determine a size and/or shape of a location.

As the user moves about the environment, the portable device may provide received beacon information and/or location information to the inventory management service and a determination is made as to whether object identifiers are to be presented to the user. In the example illustrated in FIG. 4, the user is positioned within the location 408 for tennis, the inventory management service has determined that there is a high anticipated interest in the tennis location for the user, and an object identifier 423 has been provided to the portable device 420 and presented to the user. In this example, the object identifier 423 has been created by or on behalf of store B and relates to Brand A Tennis, as illustrated by the object identifier 423. Brand A tennis is the brand of tennis items on display and available for sale at the location 408. The object identifier is associated with the unique identifier transmitted by the beacon, received by the portable device 420, and provided to the object management service. For example, the object management service maintains a data store that includes a table associating beacon identifiers with locations and object identifiers.

The object identifier provides information to the user about the location and items at the location and includes one or more action buttons. In this object identifier, the action buttons include a Save action button 410, a More action button 412 and a Send action button 414. The action buttons, when selected, cause performance of the actions with respect to the object identifier 423. For example, selection of the More action button 412 will cause the action of additional information associated with the object identifier and/or the location being provided for presentation to the user. The additional information may include information about Brand A, additional information about Brand A items, object identifiers corresponding to items at the location and/or any other supplemental or static information associated with the location. In one example, the additional information may be similar to that illustrated in FIGS. 5-7.

Figure 5:
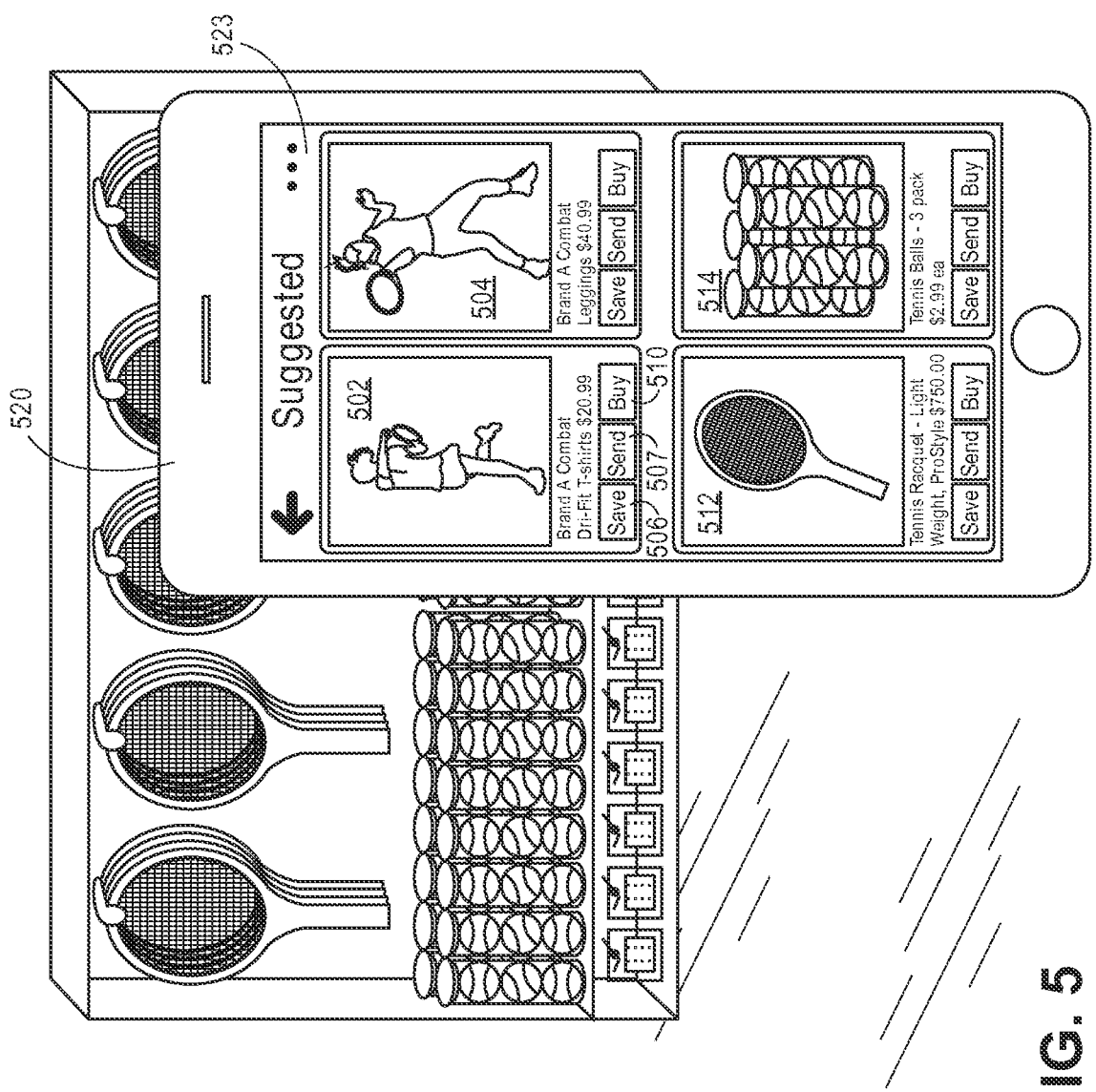
FIG. 5 is another illustration of a location and a user receiving an object identifier related to the location, according to an implementation.
Figure 5:
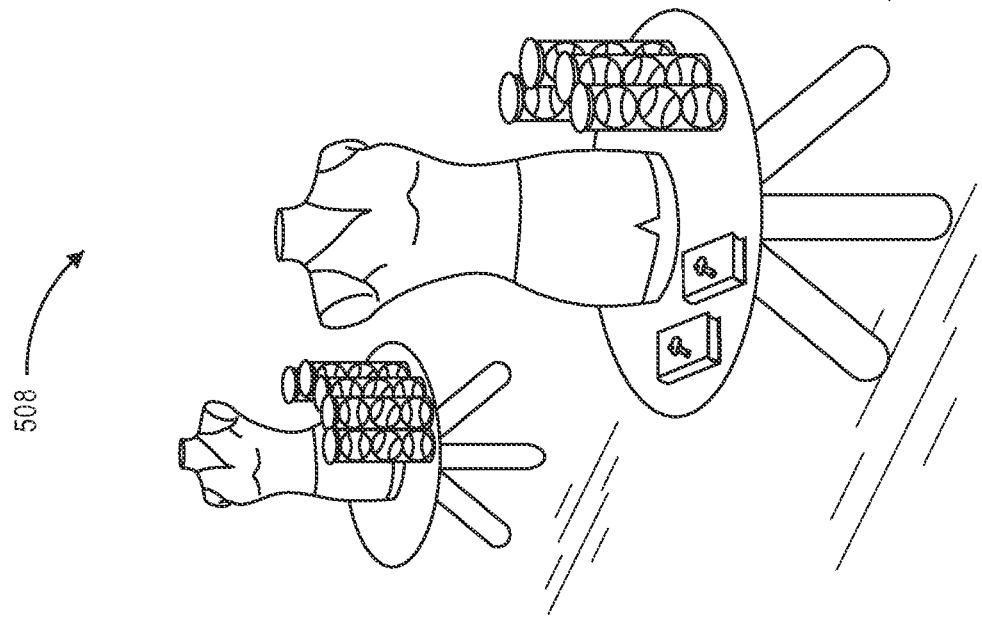

FIG. 5 is another illustration of the environment 508 and a user receiving an object identifier 523 associated with the environment, according to an implementation. In this example, the object identifier includes representations of items associated with the location that are determined to likely be of interest to the user. Items associated with the location may be determined to be of likely interest to the user based on the user profile associated with the user and maintained by the object management service. For example, the user profile may identify the gender of the user, the types of tennis items previously purchased and/or viewed, etc. Based on the information in the user profile, and attributes of the items associated with the location, items of likely interest to the user are identified. In another example, the object management service may consider what items other user's with a similar associated user profile have purchased and/or viewed and utilize that information as a factor in selecting what items to present to the user as part of the object identifier.

In this example, the object identifier 523 includes representations 502, 504, 512, 514 for multiple items associated with the location. Specifically, in this example, the representation 502 corresponds to Brand A Combat Dri-Fit T-Shirt. The representation 504 corresponds to Brand A Combat Leggings. The representation 512 corresponds to a tennis racquet and the representation 514 corresponds to tennis balls. Each representation 502, 504, 512, 514 may include one or more action buttons. In this example, each representation 502, 504, 512, 514 within the object identifier includes three action buttons, a Save action button, a Send action button, and a Buy action button.

As with the other action buttons, selection of an action button by the user will cause the corresponding action to be performed. In this example, the action will be performed with respect to the item corresponding to the representation and/or the representation. For example, if the user selects the Save action button 506, the object management service will associate an object identifier corresponding to the item Brand A Combat Dri-Fit T-shirts of the representation 502 with the user profile associated with the user. As another example, if the user selects the Send action button 507, the action of sending an object identifier representative of the object Brand A Combat Dri-Fit T-shirts will be sent to a destination (e.g., email address, social network) specified by the user.

Finally, if the user selects the Buy action button 510, the object management service will initiate the action of the user buying the represented item, in this example the Brand A Combat Dri-Fit T-shirts. In some implementations, the Buy action may include additional presentations of information that are provided to the user to facilitate the purchase of the item.

The user may also interact with the representations 502, 504, 512, 514 to obtain additional information about the represented item. For example, if the user selects the representation 504, the user is provided with an object identifier representative of the item that corresponds to the representation 504, in this example, Brand A Combat Leggings. Like the other object identifiers discussed herein, an object identifier for an item includes information (static and/or supplemental) about the item and may include one or more action buttons.

Figure 6:
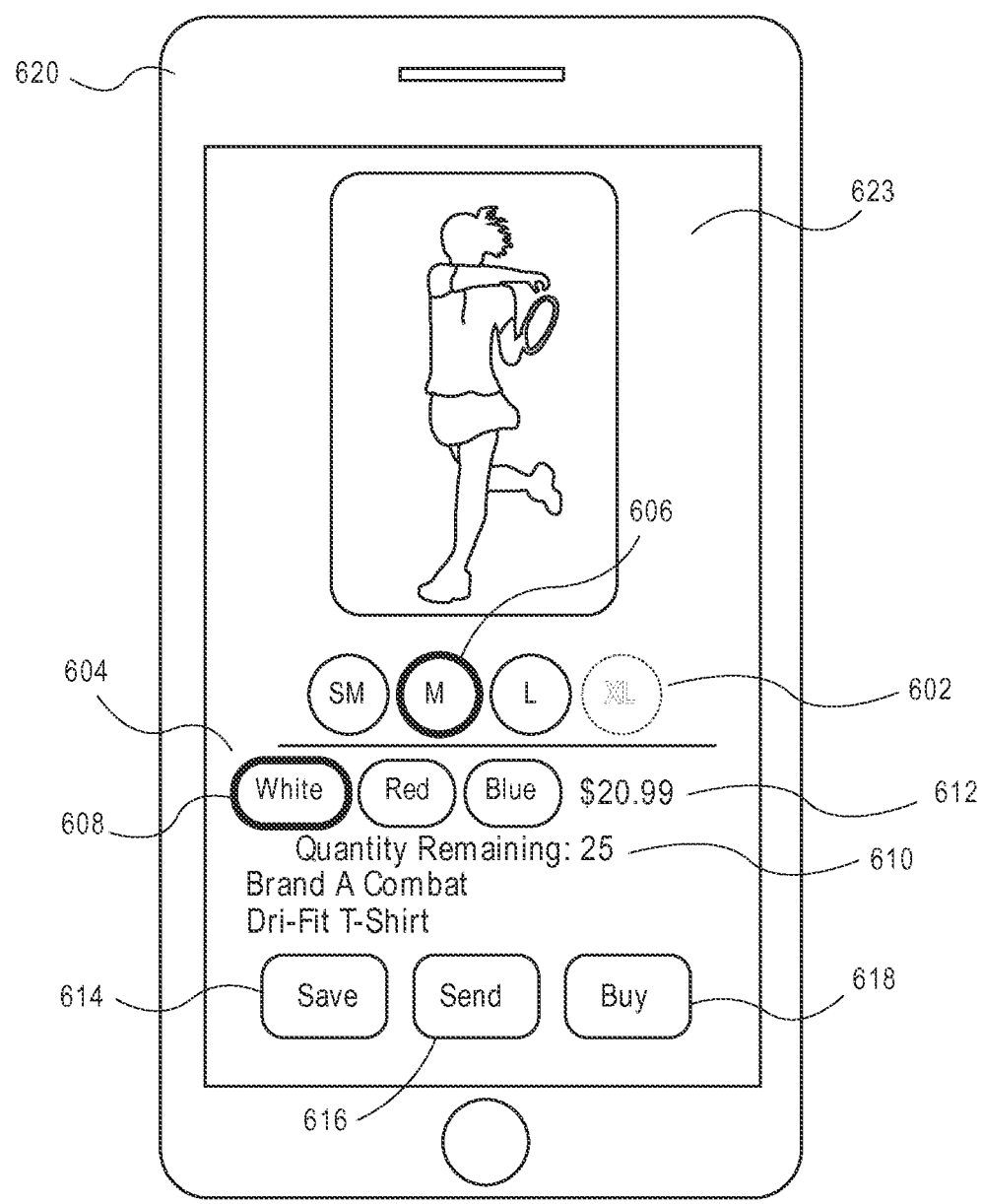
FIG. 6 is an illustration of an object identifier presented as part of an action, according to an implementation.

FIG. 6 is an illustration of an object identifier 623 corresponding to the representation 502 (FIG. 5) presented to a user in response to a user selection of the Buy action button 510, according to an implementation. In this example, the action of enabling the user to buy the represented item includes the user selecting attributes relating to the item to be purchased. The object identifier 623 includes a representation of the item and one or more attributes that are to be selected by the user as part of the action of buying the item. For example, the user may be requested to select a size 602 and a color 604 corresponding to the item. In some implementations, the attributes and the object identifier information may correspond to the available inventory within the environment. For example, the object identifier 623 identifies to the user that there are no extra-large inventory items remaining. Likewise, based on the attributes selected by the user, the object identifier 623 may be updated to identify the quantity of items available that correspond to the attributes selected by the user. In this example, the user has selected the attributes of medium 606 and white 608 for the item. Based on the selected attributes, the quantity remaining 610 may be updated to identify the number of items remaining that correspond to the selected attribute. Likewise, in some implementations, the price 612 may vary depending upon the selected attributes. In such an implementation, the price 612 may likewise be dynamically adjusted based on the selected attributes.

As with the other object identifiers, the object identifier 623 may include one or more action buttons, such as a Save action button 614, Send action button 616 and Buy action button 618. In some implementations, one or more of the action buttons may only become available after the user has selected the attributes for the item. For example, the Buy action button 618 may not become available until the user has specified the attributes for the item they desire to purchase. Selection of an action button will cause the corresponding action to be performed.

Figure 7:
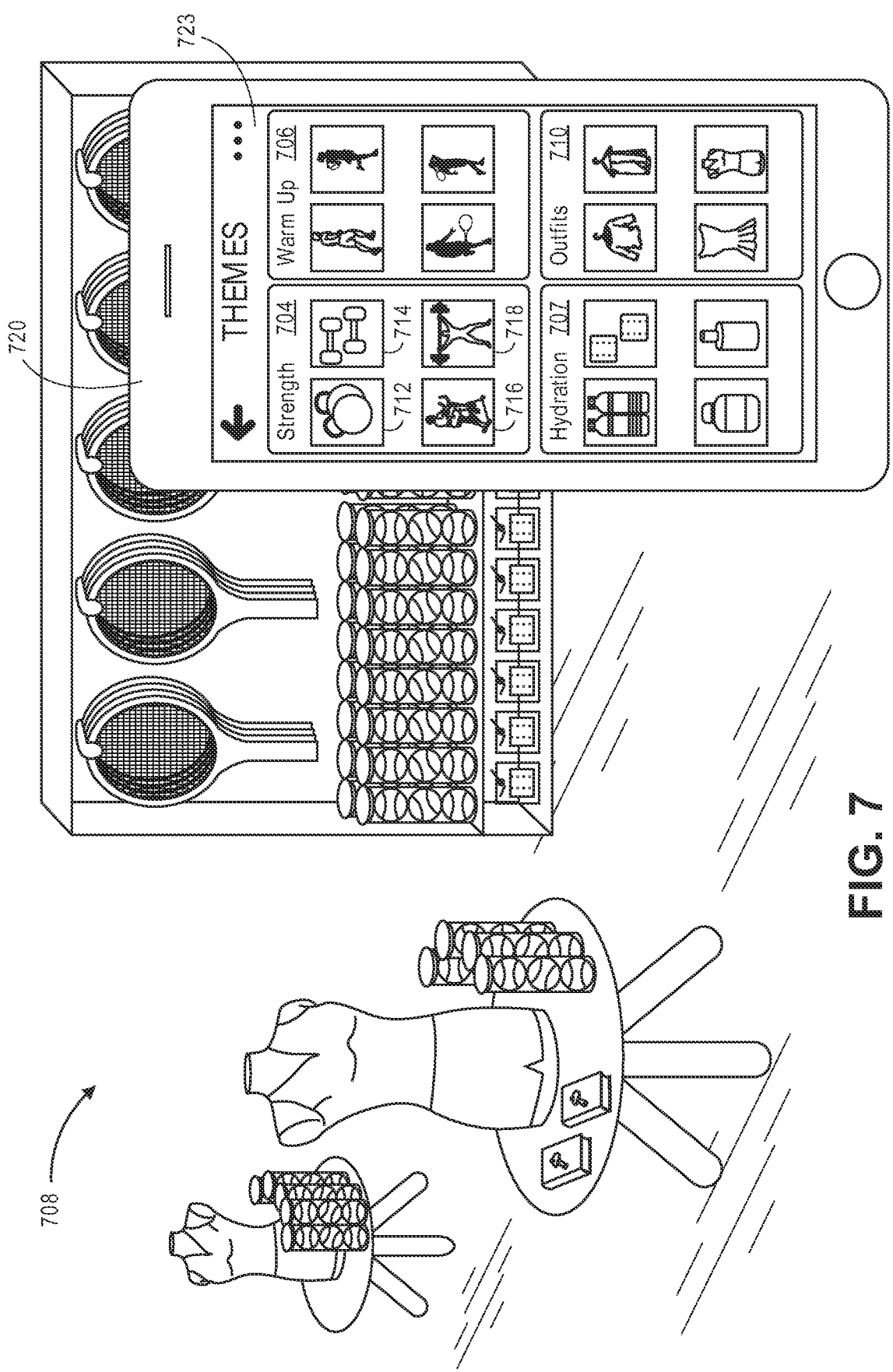
FIG. 7 is another illustration of a location and a user receiving an object identifier related to the location, according to an implementation.

FIG. 7 is another illustration of a location 708 within an environment and an object identifier 723 presented on a portable device 720 to a user, according to an implementation. In this example, the object identifier includes representations of different themes that relate to the location in which the user is positioned. Each theme may include one or more associated items, represented by object identifiers that correspond to the location and/or the theme. In this example, the themes of Strength 704, Warm Up 706, Hydration 707, and Outfits 710 are presented on the object identifier 723. Each theme may include one or more representations of items or other objects that correspond to the theme, each of which may be selected by the user. For example, the Strength 704 theme includes four representations 712, 714, 716, 718, each of which may be selected by the user to obtain additional information. The user may select a representation, such as representation 712 and obtain additional information corresponding to the representation, such as object identifiers representative of items associated with the representation and/or the theme. In some implementations, the themes and/or the representations presented in the themes may correspond to items determined to be of likely interest to the user.

Figure 8:
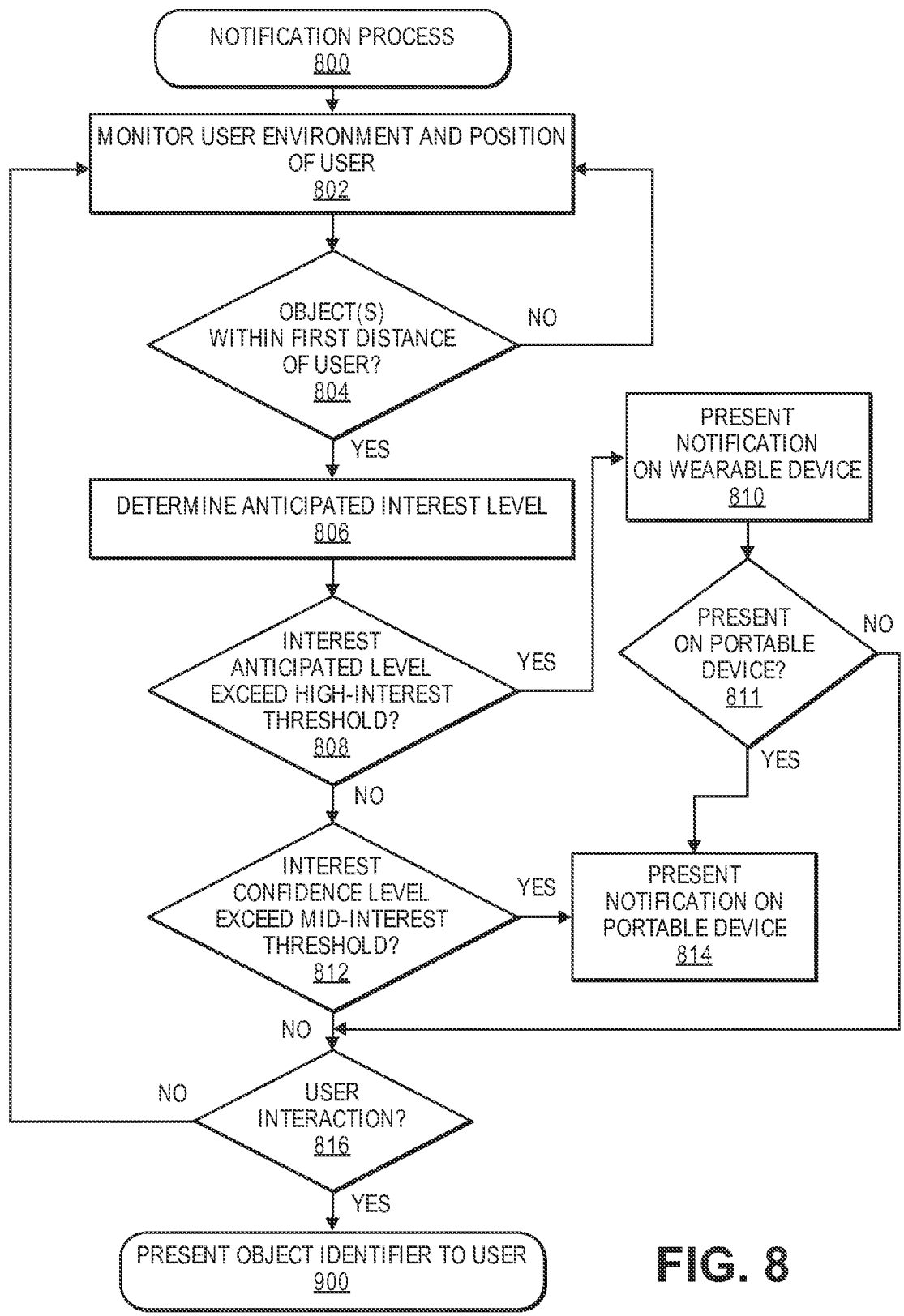
FIG. 8 illustrates an example process for notifying a user about an object in an environment, according to an implementation.

FIG. 8 illustrates an example process 800 for notifying a user about an object in an environment, according to an implementation. The example process 800 and each of the other processes described herein are illustrated as a collection of blocks in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded or uploaded through the Internet or other networks. Finally, the order in which the operations are described is not intended to be construed as a limitation, and any number of the described operations can be combined in any order and/or in parallel to implement the process. Likewise, additional or fewer operations than those described may be utilized with the various implementations described herein.

The example process 800 begins by monitoring an environment in which a user is located and a position of the user, as in 802. For example, a portable device associated with a user may obtain position information that is used to determine the position of the user. Position information may be obtained from GPS data, Wi-Fi networks, indoor positioning systems, etc. Likewise, the portable device may monitor for any detectable beacons within the environment. For example, beacons such as iBeacons, AltBeacons, RFID tags, etc., may periodically or continuously transmit a signal that includes identifiable information. The beacon may be detected by the portable device using one or more of a variety of input components, such as a Bluetooth receiver, a NFC receiver, Wi-Fi receiver, etc. In some implementations, the portable device may also obtain other inputs from the environment. For example, the portable device may obtain audio using a microphone of the portable device and/or obtain images using an image capture device (camera) of the portable device. In one implementation, the portable device may obtain a segment of audio (e.g., five seconds) from the environment, a series of images over a period of time, and/or a segment of video from the environment.

Based on the position of the user, detected beacons, obtained audio, and/or obtained images/video, a determination is made as to whether any objects are within a first distance of a user for which an object identifier exists that may be presented to the user, as in 804. For example, the portable device may send position information, any detected beacons, audio, images/video, a user identifier representative of the user, a device identifier representative of the portable device, or any combination thereof, to the object management service for processing.

The object management service may utilize the position information to determine if there are any objects within a first defined distance of the position of the user. For example, the object management service may maintain an object data store that includes information for objects and corresponding object identifiers. The information may include, among other things, position information for each object within an environment. Based on the position of the user and the position information associated with the objects and maintained in the object data store, it is determined whether any objects are within a first distance of the user. The first distance may be any defined distance and may vary for different users, different objects, different locations, different environments, etc.

In addition to or as an alternative to the position information, the object management service may utilize any received beacon information to determine objects within the first defined distance of the position of the user. For example, the object data store may also include for each object identified in the object data store any beacon identifiers associated with the object. If a beacon identifier is received from the portable device, the objects associated with the beacon identifier are identified from the object data store.

As still another example, any recorded audio received from the portable device may also be utilized to determine objects within a first distance of the user. For example, the object management service may maintain in the objects data store audio data corresponding to objects. As an example, the object data store may maintain audio information (e.g., a recording of the audio, waveform patterns) corresponding to movies, television shows, songs (each objects), sounds made by objects (e.g., car horns, sirens, drills, trains), etc. When audio is received from the portable device, the audio may be processed to determine a waveform pattern and/or the audio may be compared with stored audio information associated with objects to determine if one or more objects identified in the object data store correspond with the received audio.

Similar to audio, any received images and/or video of the environment may be processed and compared with image data maintained by the object management service to determine any objects that correspond with the image/video. For example, received images or video may be processed using one or more image processing techniques, such as edge detection, object detection, grey scale image processing, etc., and compared to image data maintained in the object data store for objects to determine if one or more objects identified in the object data store correspond with the images/video. For example, if the image received from the portable device includes a representation of all or a portion of the Eiffel Tower, the image may be processed using edge detection to detect the shape of the tower and generate image information representative of the image. The processed image information may be compared with image data maintained by the object management service to determine a correlation. If the correlation exceeds a threshold, it may be determined that the object represented in the received image has been determined.

While the above describes determining objects based on user position, beacon information, audio and images/video, it will be appreciated that other forms of input may likewise be used to determine objects within a first distance of a user. For example, a user may provide input identifying an object. Likewise, it will be appreciated that inputs may be used alone or in combination to determine objects within a first distance of a user.

Returning to FIG. 8, a determination is made as to whether any objects within the first distance have been determined, as in 804. If no objects have been determined, the example process 800 returns to block 802 and continues. If one or more objects have been determined, an anticipated interest level for each object is determined, as in 806. An anticipated interest level represents the likelihood that a user will be interested in the detected object.

The anticipated interest level is determined based on attributes of the determined object and the user profile associated with the user. For example, the user profile may identify past purchases of the user, objects previously viewed by the user, objects or categories of objects that are of interest to the user (e.g., specified by the user or determined to be of interest based on the user's behavior), object identifiers viewed, shared, and/or saved, etc.

The anticipated interest level may also vary based on the environment in which the user is located. For example, if the environment is often frequented by the user (e.g., part of the user's commute to and/or from work), the anticipated interest level for objects in that environment for which object identifiers have previously been presented to the user may be reduced, as the user is likely already aware of those objects.

By comparing the user profile and the attributes of an object, an anticipated interest level may be determined. The anticipated interest level may be represented as a numerical score, ranking, etc., or any other form representing a similarity between the user profile and the attributes.

A determination is then made as to whether the anticipated interest level exceeds a high-interest level threshold, as in 808. The high-interest level threshold may be any threshold and may vary for different users, different objects, different environments, based on how recently the user was presented another notification, etc. For example, if the user has recently received a notification via a wearable device associated with the user but has not interacted with or presented an interest in the notification, the high-interest threshold may be increased to reduce any likelihood of disturbing the user.

If it is determined that the anticipated interest level exceeds a high-interest threshold, a notification is presented to the user via a wearable device associated with the user, as in 810. As discussed above, the object management service may send information to the portable device that is then sent to the wearable device for the notification and/or the object management service may send the notification directly to the wearable device. The presentation of the notification by the wearable device may be an audible presentation, haptic presentation, visual presentation, or any combination thereof. In some implementations, if the user is not wearing a wearable device, the notification may be presented by the portable device.

A determination may also be made as to whether the notification is to be presented on the portable device, as in 811. Notification on the portable device, in addition to the wearable device, may be optional and/or specified by the user. If it is determined that the notification is also to be presented by the portable device, the notification is presented by the portable device, as in 814. Similar to the wearable device, the portable device may present the notification audibly, visually, and/or with haptic output.

Returning to decision block 808, if it is determined that the anticipated interest level does not exceed the high-interest threshold, a determination is made as to whether the interest level exceeds a mid-interest threshold, as in 812. The mid-interest threshold, like the high-interest threshold, may be any value and may vary for different users, different objects, different environments, etc. If it is determined that the anticipated interest level exceeds the mid-interest threshold, the notification is presented by the portable device, as in 814.

The high-interest threshold and the mid-interest threshold are utilized to filter or limit the amount of notifications that are presented to a user to only those that are determined to be of likely interest to the user. Likewise, because of the volume of potential notifications of different objects within a defined distance of a user and the variability of a user's interest in any one object, the high-interest level may be used to filter out all but those notifications relating to objects that are very likely to be of interest to the user because notifications presented using a wearable device may be considered by the user to be more invasive than notifications presented using the portable device.

If it is determined that the anticipated interest level does not exceed the mid-interest threshold and/or if it is determined at decision block 811 not to present the notification using the portable device, a determination is made as to whether an interaction has been received by the user, as in 816. An interaction may be a physical interaction by the user with the wearable device and/or the portable device. For example, if a notification is presented by the wearable device, the user positions the wearable device into a field of view and maintains that position for a defined period of time (e.g., two seconds) or physically touches the wearable device, it may be determined that a user interaction has been received. As another example, if the user interacts with the portable device, e.g., by touching a touch-sensitive display of the portable device, it may be determined that a user interaction has been received.

A user interaction may be determined in response to presenting a notification or if a notification is not presented. For example, a user may request information about an object within a defined distance even if a notification was not presented to the user.

If it is determined that an interaction has been received, one or more object identifiers corresponding to the determined object are presented to the user, as in 900. Presentation of an object identifier to a user is discussed in further detail below with respect to FIG. 9. If it is determined that a user interaction has not been received, the example process 800 returns to block 802 and continues.

Figure 9:
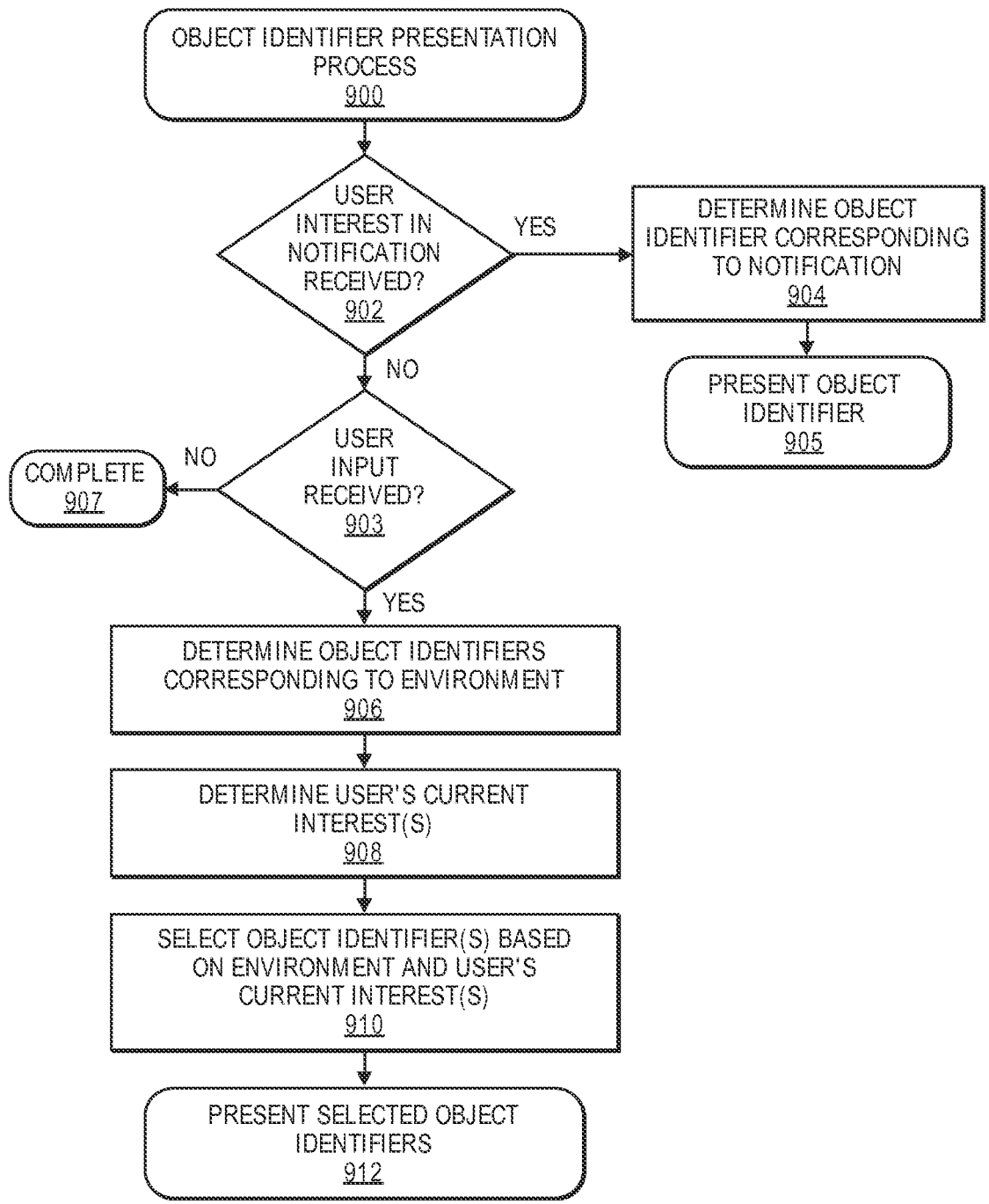
FIG. 9 illustrates an example process for presenting an object identifier related to an object in the environment, according to an implementation.

FIG. 9 illustrates an example process 900 for presenting an object identifier related to an object in an environment, according to an implementation. The example process 900 begins by determining if a user has expressed an interest in a notification, as in 902. For example, as discussed above with respect to FIG. 8, a user may express an interest in a presented notification by viewing the notification for a defined period of time and/or by interacting with the notification.

If it is determined that the user has expressed an interest in a notification, the object identifier(s) associated with the notification are determined, as in 904. As discussed above, a notification may be generated to notify a user about an object located within a distance of the user. The object will have one or more corresponding object identifiers maintained in an object identifier data store by the object management service. When a notification is sent for presentation to a user, the corresponding object identifier(s) are associated with the notification.

The determined object identifier(s) are then presented to the user, as in 905. If there are more object identifiers associated with the notification, selection of the object identifier to present may be done in a variety of manners. In one implementation, an object identifier from a plurality of object identifiers associated with the notification may be randomly selected, selected based on a preference of the user, selected based on a planned rotation of object identifier types, etc.

If it is determined at decision block 902 that a user interest in a notification has not been received, a determination is made as to whether a user input requesting an object identifier representative of an object within a distance of the user is determined, as in 903. For example, a user may request an object identifier by providing input to an application running on a portable device associated with the user. If it is determined that a user input has not been received, the example process completes, as in 907. If a user input has been received, object identifiers corresponding to objects within a distance of the user are determined, as in 906. Object identifiers corresponding to objects within a distance of a user may be determined as discussed above.

A determination is also made as to the user's current interest(s), as in 908. The user's current interest may be an explicit input from the user and/or may be inferred based on the activities of the user. For example, as discussed below with respect to FIG. 10, if the user selects to record audio (a user input), the current interest of the user is determined to be an object corresponding to the recorded audio. As another example, if the user is a male and located in a women's section of a sporting goods store and his calendar indicates that his wife's birthday is the following week, it may be inferred that the user is interested in objects that he may purchase for his wife as a gift. In some implementations, the object management service may consider multiple user profiles to determine the user's current interest. Continuing with the current example, the object management service may consider the user profile of both the male and his wife to determine the user's current interest.

Based on the determined interest of the user, one or more object identifiers corresponding to objects within a defined distance of the user are selected, as in 910. For example, attributes of objects within a defined distance of the user are compared to the determined interest of the user to select one or more object identifiers for presentation to the user. In some implementations, the distance between the position of the user and the objects may be considered and objects that are physically closer to the position of the user may be given a higher weight when determining an object identifier to select for presentation to the user.

Finally, the selected object identifier(s) are presented to the user, as in 912. For example, the object management service may send the selected object identifier(s) to a portable device associated with the user and the portable device may present the object identifier(s) to the user via the display of the portable device.

Figure 10:
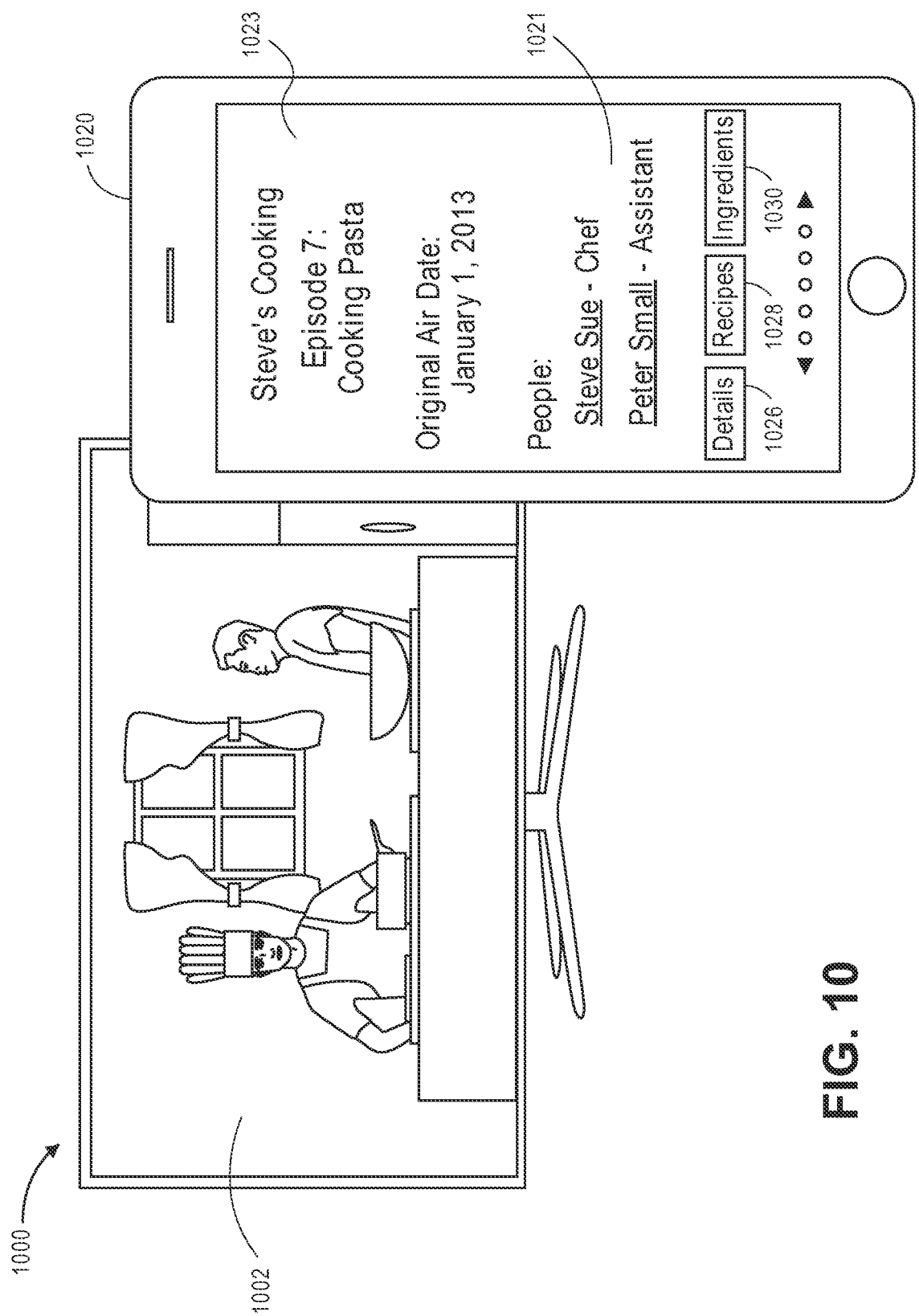
FIG. 10 is an illustration of an environment and a user receiving an object identifier related to an object determined in the environment, according to an implementation.

FIG. 10 is an illustration of an environment 1000 and a user receiving an object identifier 1023 related to an object determined in the environment, according to an implementation. In this example, the object is a television show and the television show was determined based on audio input received by the portable device 1020. To determine the television show, the portable device recorded a segment of audio from the television show and provided the recorded audio to the object management service for processing. The object management service processed the segment of audio and compared the segment of audio with audio information associated with objects maintained in the object data store. Based on the comparison, the object is determined, in this example, a television show, and the object identifier 1023 representative of the object is sent to the portable device 1020 and presented by the portable device to the user.

As with the other examples, the object identifier 1023 includes information 1021 about the object, such as the actors, the original air date of the show, the episode, etc. Likewise, the object identifier includes one or more action buttons 1026, 1028, 1030 that if selected will cause the corresponding action to be performed. In this example, the object identifier includes three action buttons. Specifically, the object identifier 1023 includes a Details action button 1026 that if selected will cause the action of an object identifier with additional details relating to the object to be presented to the user. The object identifier 1023 also includes a Recipes action button 1028 that will cause the action of an object identifier that includes the recipes for the meal or food that was prepared as part of the episode (object) to be presented to the user. The object identifier also includes an Ingredients action button 1030 that if selected will cause the action of an object identifier with a list of ingredients needed for the food prepared as part of the episode to be presented to the user.

While the example illustrated in FIG. 10, includes action buttons corresponding to food, in other examples, the action buttons may be determined and presented based on other objects or information that correspond to the detected object. For example, if the object is a sporting event, the action buttons may correspond to actions that would cause object identifiers corresponding to the sporting event, the players and/or the teams involved in the sporting event to be presented. For example, a Details action button may result in information about the sporting event, the teams, the stadium, the results, etc., to be presented to the user.

Figure 11:
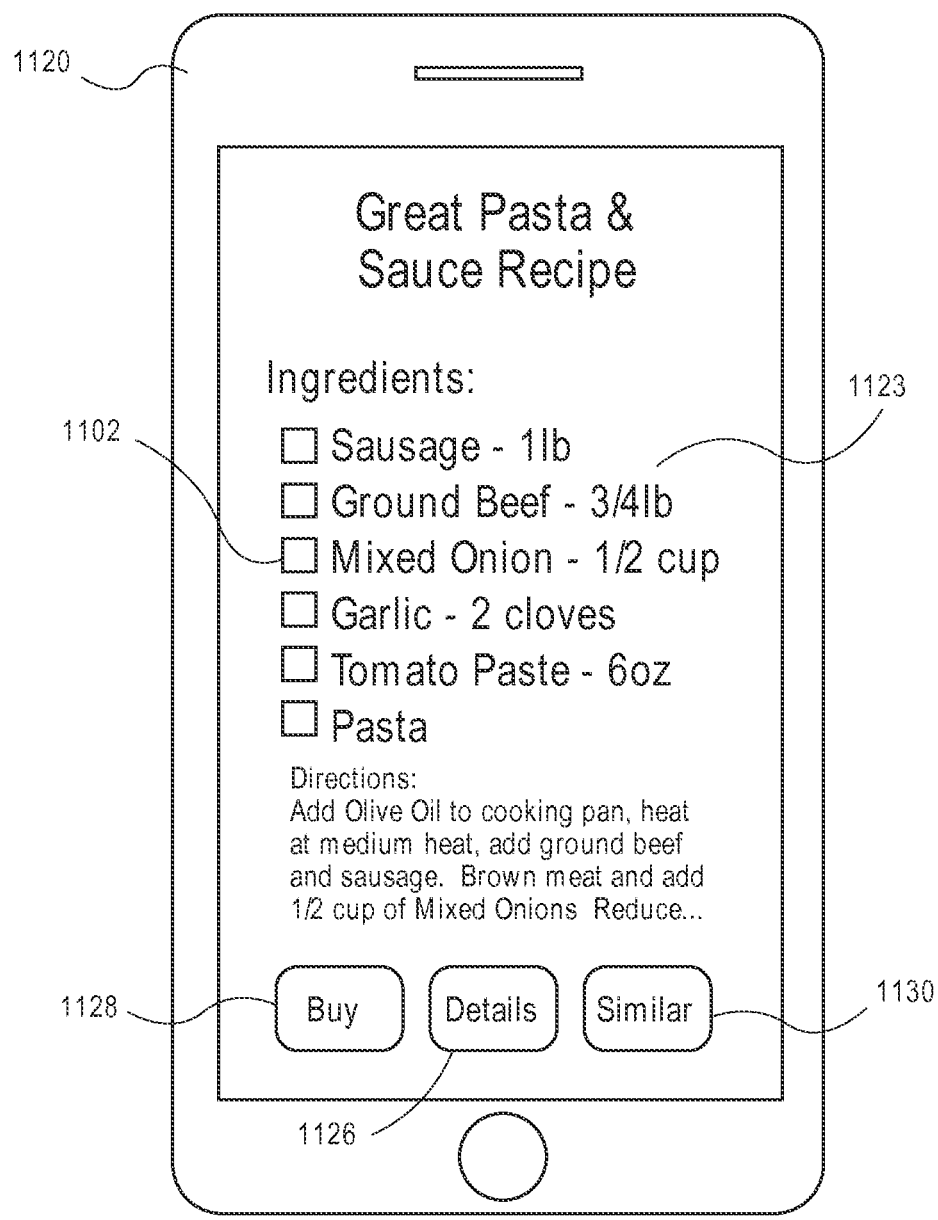
FIG. 11 is an illustration of an object identifier presented as part of an action, according to an implementation.

FIG. 11 is an illustration of an object identifier presented to a user in response to a user selecting the Recipes action button 1028 (FIG. 10), according to an implementation. In response to a user selecting the Recipes action button 1028, the object management service determines an object identifier 1123 that includes the recipe corresponding to the food prepared as part of the episode. The object identifier 1123 is associated in the object data store with the object identifier 1023. The object identifier 1123 is sent to the portable device and presented to the user. The object identifier includes information 1102 about the object represented by the object identifier, in this example, a recipe for pasta. Likewise, one or more action buttons 1126, 1128, and 1130 corresponding to the object may also be included in the object identifier.

As discussed above, selection of an action button will cause a corresponding action to be performed with respect to the object identifier. For example, selection of the Buy action button 1128 will cause the action of buying the ingredients included in the object identifier to be initiated. Such an action may include additional presentation and interaction with other information, such as a location from which the user will obtain the items, price, etc.

Selection of the Details action button 1126 will cause additional details about the recipe to be presented to the user. Finally, selection of the Similar action button 1130, will cause the object management service to identify and provide object identifiers representative of recipes determined to be similar to the recipe included in the object identifier 1123.

Figure 12:
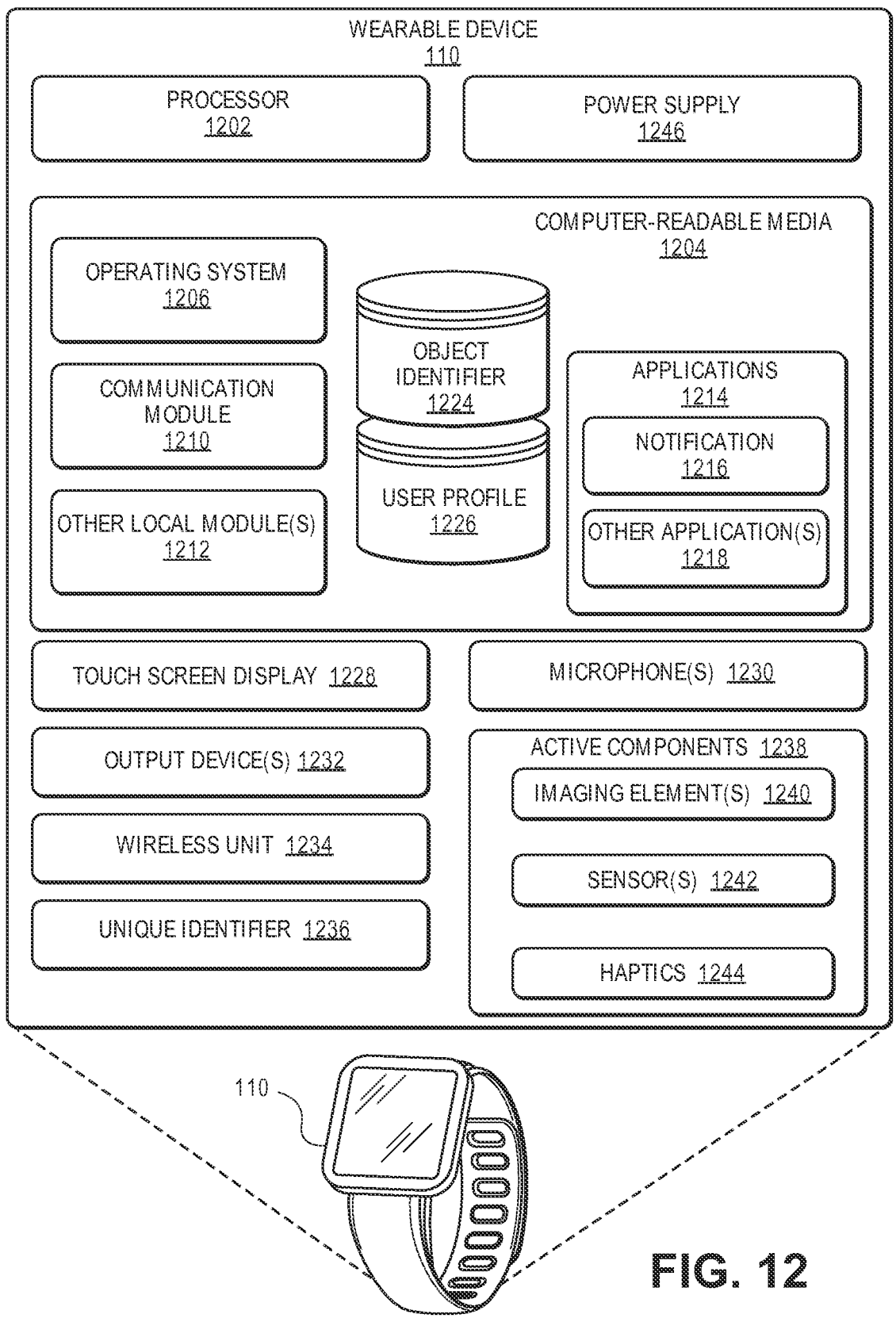
FIG. 12 illustrates an example wearable device that may be used in accordance with various implementations.

FIG. 12 illustrates example functional components of an example wearable device, according to an implementation. The wearable device 110 includes one or more processors 1202 and computer-readable media 1204. The computer-readable media 1204 may include non-transitory computer-readable media, such as volatile and nonvolatile memory, removable and non-removable media implemented in any method or technology for storage of information, such as computer-readable instructions, data structures, program modules, or other data. Such non-transitory computer-readable media includes, but is not limited to, RAM, ROM, EEPROM, flash memory or other memory technology. The non-transitory computer-readable media 1204 may be implemented as computer-readable storage media ("CRSM"), which may be any available physical media accessible by the processor(s) 1202 to execute instructions stored on the media 1204. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 1202.

Several modules, such as instruction, data stores, and so forth, may be stored within the computer-readable media 1204 and configured to execute on the processor(s) 1202. A few example functional modules are shown stored in the computer-readable media 1204, although the same functionality may alternatively be implemented in hardware, firmware, or as a system on a chip (SOC).

An operating system module 1206 may be configured to manage hardware and services within and coupled to the wearable device 110 for the benefit of other modules. A communication module 1210 facilitates communication, such as cellular communication, RF communication, Wi-Fi communication, Bluetooth communication, NFC communication, satellite-based communication, and so forth. For example, the communication module 1210 may facilitate communication with a portable device and/or the object management service via one or more networks, as discussed above with respect to FIG. 1. Other local modules 1212 may also be present on the device, depending upon the implementation and configuration of the device.

The wearable device 110 may also include a plurality of applications 1214 stored in the non-transitory computer-readable media 1204 or otherwise accessible to the wearable device 110. In this implementation, the applications 1214 are a notification application 1216 and other applications 1218. The wearable device 110 may include any number or type of applications and is not limited to the specific example shown here. Data stores may also be stored locally on the media 1204, including an object identifier data store 1224 and one or more user profiles 1226 of users that have interacted with and/or use the wearable device 110. The object identifier data store 1224 may include object identifiers provided by the portable device and/or the object management service. The user profile(s) data store 1226 may include user preferences (e.g., when and/or how should a user be notified).

Generally, the wearable device 110 has a touch screen display 1228 and may include other input devices, such as a keypad, control buttons, etc. One or more microphones 1230 may also be included to receive audio input. Output devices 1232 may include a display, an illumination element (e.g., LED), a vibrator to create haptic sensations, speakers or the like. The wearable device 110 might further include a wireless unit 1234 coupled to an antenna to facilitate a wireless connection to one or more networks. The wireless unit 1234 may implement one or more of various wireless technologies, such as Wi-Fi, Bluetooth, RF, NFC, and the like.

The wearable device may also include an embedded unique identifier 1236. The unique identifier may be embedded into a memory 1204 of the wearable device 110 or otherwise stored and accessible by the wearable device 110.

The wearable device 110 is also equipped with multiple active components 1238. Any number of components may be used. Representative active components include imaging elements 1240, sensor(s) 1242, and haptics 1244. The wearable device 110 may also include some form of power supply 1246, such as a battery, solar power, or other form of power supply for providing power to the wearable device during operation.

Figure 13:
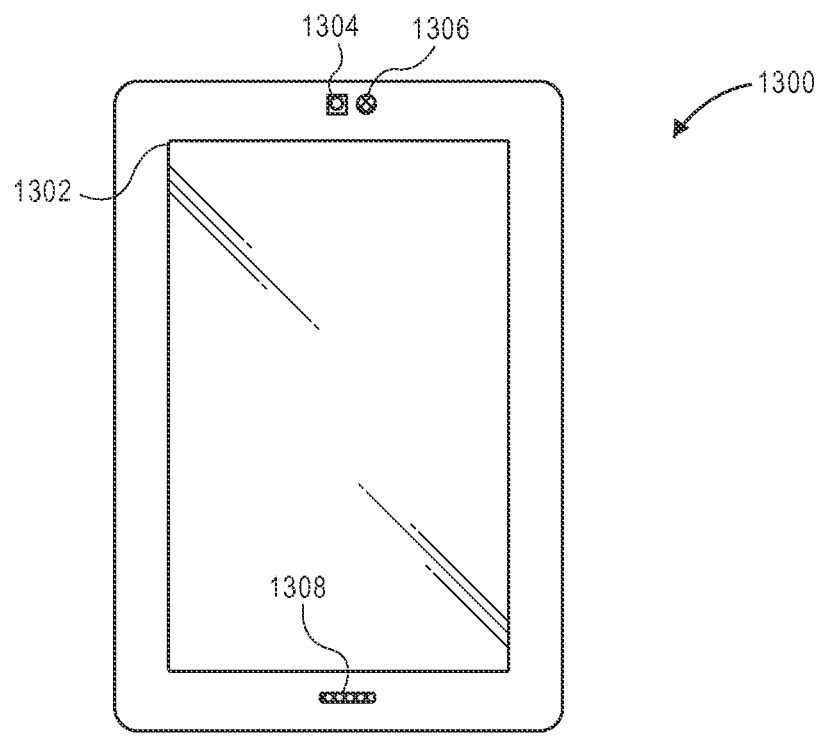
FIG. 13 illustrates an example computing device that can be used in accordance with various implementations.

FIG. 13 illustrates an example client device 104 that can be used in accordance with various implementations described herein. In this example, the client device 104 includes a display 1302 and optionally at least one input component 1304, such as a camera. The client device 104 may also include an audio transducer, such as a speaker 1306, and optionally a microphone 1308. Generally, the client device 104 may have any form of input/output components that allow a user to interact with the client device 104. For example, the various input components for enabling user interaction with the device may include a touch-based display 1302 (e.g., resistive, capacitive, Interpolating Force-Sensitive Resistance (IFSR)), camera, microphone, global positioning system (GPS), compass or any combination thereof. One or more of these input components may be included on a device or otherwise in communication with the device. Various other input components and combinations of input components can be used as well within the scope of the various implementations as should be apparent in light of the teachings and suggestions contained herein.

Figure 14:
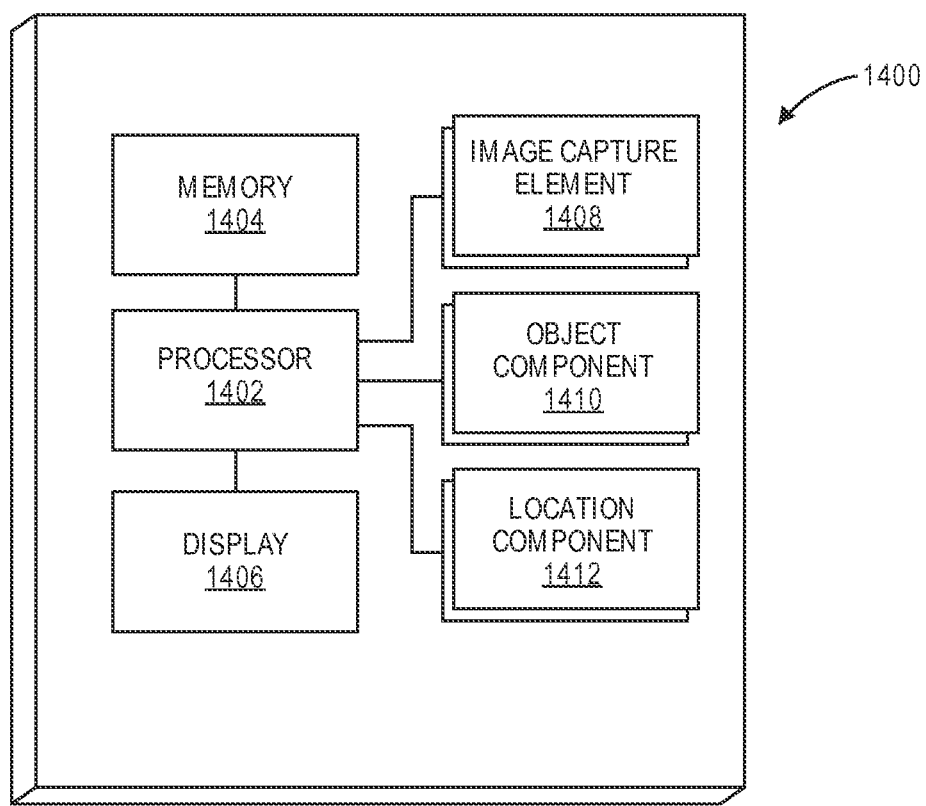
FIG. 14 illustrates an example configuration of components of a computing device, such as that illustrated in FIG. 13.

In order to provide the various functionality described herein, FIG. 14 illustrates an example set of basic components 1400 of a client device, such as the client device 1300 described with respect to FIG. 13 and discussed herein. In this example, the device includes at least one central processor 1402 for executing instructions that can be stored in at least one memory device or element 1404. As would be apparent to one of ordinary skill in the art, the device can include many types of memory, data storage or non-transitory computer-readable storage media, such as a first data storage for program instruction for execution by the processor 1402. Removable storage memory can be available for sharing information with other devices, etc. The device typically will include some type of display 1406, such as a touch-based display, electronic ink (e-ink), organic light emitting diode (OLED) or liquid crystal display (LCD).

As discussed, the device in many implementations will include at least one image capture element 1408, such as one or more cameras that are able to image objects in the vicinity of the device. An image capture element can include or be based at least in part upon any appropriate technology, such as a CCD or CMOS image capture element having a determined resolution, focal range, viewable area, and capture rate. The device can include at least one object component 1410 for performing the process of creating an object identifier that identifies an object, and/or interacting with the object management service 103 (FIG. 1) as part of the process of creating an object identifier that identifies an object. For example, the client device may be in constant or intermittent communication with the object management service and may exchange information, such as representations, descriptions, position information, object identifiers, etc., with the object management service.

The device also can include at least one location component 1412, such as GPS, NFC location tracking or Wi-Fi location monitoring. Location information obtained by the location component 1412 may be used with the various implementations discussed herein to identify the position of the user, object location, and the like.

The example client device may also include at least one additional input device able to receive conventional input from a user. This conventional input can include, for example, a push button, touch pad, touch-based display, wheel, joystick, keyboard, mouse, trackball, keypad or any other such device or element whereby a user can input a command to the device. These I/O devices could be connected by a wireless, infrared, Bluetooth, or other link as well in some implementations. In some implementations, however, such a device might not include any buttons at all and might be controlled only through touch (e.g., touch-based display), audio (e.g., spoken) commands, or a combination thereof.

Figure 15:
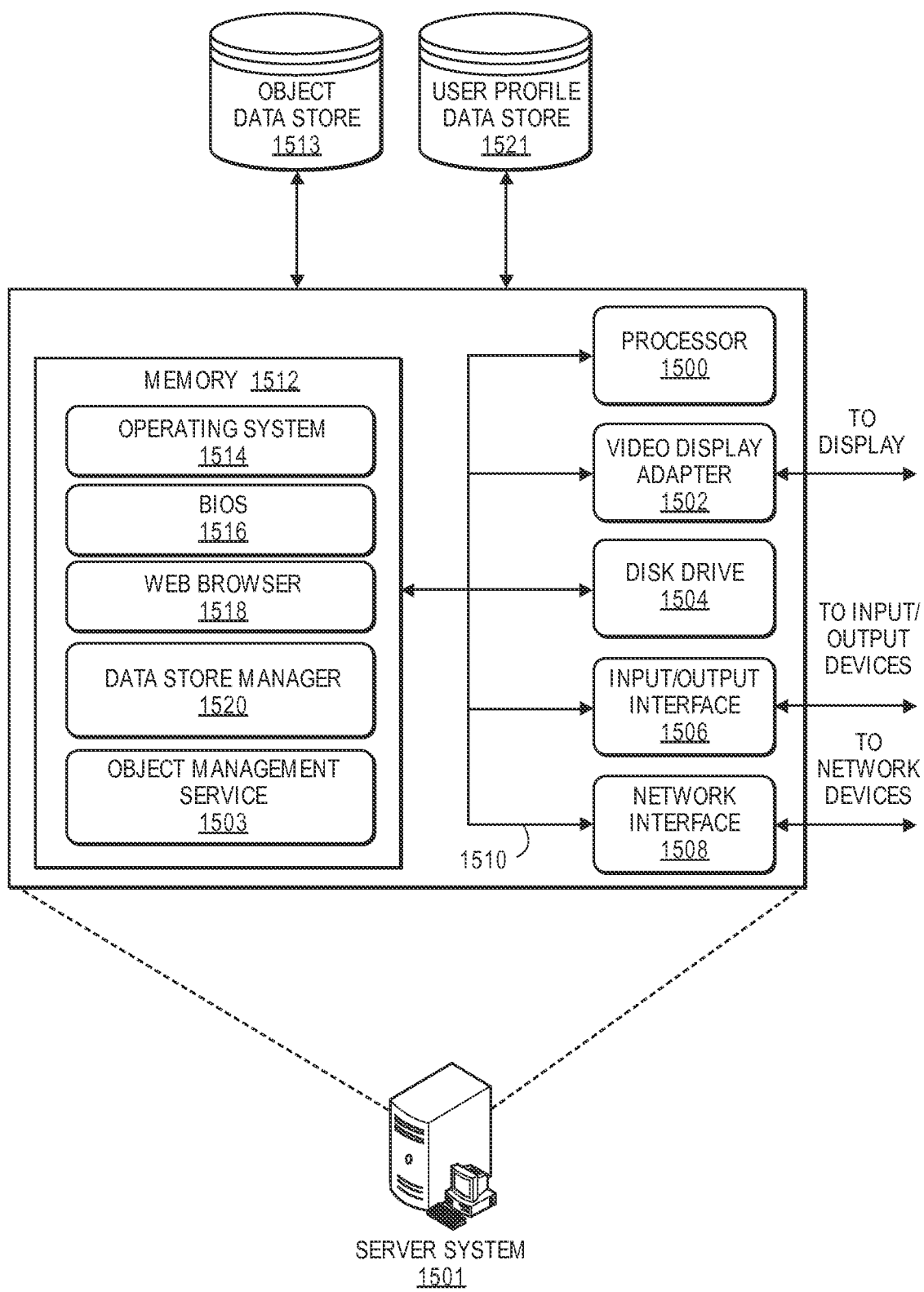
FIG. 15 is a pictorial diagram of an illustrative implementation of a server system that may be used for various implementations.

FIG. 15 is a pictorial diagram of an illustrative implementation of a server system 1501, such as the server system 101 that may be used in the environment of FIG. 1. The server system 1501 may include a processor 1500, such as one or more redundant processors, a video display adapter 1502, a disk drive 1504, an input/output interface 1506, a network interface 1508, and a memory 1512. The processor 1500, the video display adapter 1502, the disk drive 1504, the input/output interface 1506, the network interface 1508, and the memory 1512 may be communicatively coupled to each other by a communication bus 1510.

The video display adapter 1502 provides display signals to a local display (not shown in FIG. 15) permitting an operator of the server system 1501 to monitor and configure operation of the server system 1501. The input/output interface 1506 likewise communicates with external input/output devices not shown in FIG. 15, such as a mouse, keyboard, scanner, or other input and output devices that can be operated by an operator of the server system 1501. The network interface 1508 includes hardware, software, or any combination thereof, to communicate with other computing devices. For example, the network interface 1508 may be configured to provide communications between the server system 1501 and other computing devices, such as the client device 120, via the network 105, as shown in FIG. 1.

The memory 1512 generally comprises random access memory (RAM), read-only memory (ROM), flash memory, and/or other volatile or permanent memory. The memory 1512 is shown storing an operating system 1514 for controlling the operation of the server system 1501 A binary input/output system (BIOS) 1516 for controlling the low-level operation of the server system 1501 is also stored in the memory 1512.

The memory 1512 additionally stores program code and data for providing network services that allow client devices 120 to exchange information and data files with the server system 1501 and/or the object management service 1503. Accordingly, the memory 1512 may store a browser application 1518. The browser application 1518 comprises computer executable instructions, that, when executed by the processor 1500, generate or otherwise obtain configurable markup documents such as Web pages. The browser application 1518 communicates with a data store manager application 1520 to facilitate data exchange and mapping between the object data store 1513 and/or the user profile data store 1521, and/or devices, such as the client device 120 shown in FIG. 1.

As used herein, the term "data store" refers to any device or combination of devices capable of storing, accessing and retrieving data, which may include any combination and number of data servers, databases, data storage devices and data storage media in any standard, distributed or clustered environment. The server system 1501 can include any appropriate hardware and software for integrating with the data stores 1513, 1521 as needed to execute aspects of one or more applications for the client device 101, and/or the object management service 1503. The server system 1501 provides access control services in cooperation with the data stores 1513, 1521 and is able to generate content such as text, graphics, audio, video and/or object identifiers or set related information (e.g., representations, context, descriptions) to be transferred to the client device 120.

The data stores 112-120 can include several separate data tables, databases or other data storage mechanisms and media for storing data relating to a particular aspect. For example, the data stores 1513, 1521 illustrated include mechanisms for storing content, user information, mappings and external source information, representations, which can be used to generate and deliver content (e.g., sets, object identifiers, representations) to client devices 120.

It should be understood that there can be many other aspects that may be stored in the data stores 1513, 1521, which can be stored in any of the above listed mechanisms as appropriate or in additional mechanisms of any of the data stores 1513, 1521. The data stores 1513, 1521 are operable, through logic associated therewith, to receive instructions from the server system 1501 and obtain, update or otherwise process data in response thereto.

The memory 1512 may also include the object management service 1503, discussed above. The object management service 1503 may be executable by the processor 1500 to implement one or more of the functions of the server system 1501. In one implementation, the object management service 1503 may represent instructions embodied in one or more software programs stored in the memory 1512. In another implementation, the object management service 1503 can represent hardware, software instructions, or a combination thereof.

The server system 1501, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction in FIG. 15 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A non-transitory computer-readable storage medium storing instructions that, when executed by a processor, cause the processor to at least:
   receive, at a computing resource that is independent of a portable device associated with a user, a transmission from the portable device, the transmission including:
      a beacon detected by the portable device, wherein the beacon:
         is transmitted from a first object within an environment in which the portable device is positioned; and
         includes identifiable information corresponding to the first object;
      a location of the portable device within the environment; and
      at least one of a user identifier associated with the user or a device identifier of the portable device;
   in response to receiving the transmission, obtain from at least one data store:
      a first object identifier associated with the identifiable information, wherein the first object identifier is representative of the first object; and
      a user profile associated with at least one of the user identifier or the device identifier;
   based at least in part on a determination that an anticipated interest level exceeds a first threshold:
      send, for presentation by a wearable device associated with the user, a notification representative of the first object that includes initial information about the first object;
      receive an interaction from the user by the wearable device; and
      based at least in part on a receipt of the interaction by the wearable device, send an instruction to the portable device to present the first object identifier on the portable device;
   subsequent to the notification being sent to the wearable device and the first object identifier being sent to the portable device and based at least in part on a determination that the portable device is positioned within a proximity threshold:
    obtain from the at least one data store a second object identifier; and
    send, for presentation on at least one of the wearable device or the portable device, the second object identifier,
wherein the first object identifier and the second object identifier are different.

2. The non-transitory computer-readable storage medium of claim 1, wherein the instructions that, when executed by the processor, further cause the processor to at least:
    if it is determined that the anticipated interest level exceeds a second threshold but does not exceed the first threshold:
        not send for presentation by the wearable device the notification; and
        send for presentation by the portable device the first object identifier.

3. The non-transitory computer-readable storage medium of claim 1, wherein the instructions that, when executed by the processor, further cause the processor to at least:
    if it is determined that the anticipated interest level does not exceed the first threshold:
        determine if the interaction from the user is received by the portable device or the wearable device requesting the first object identifier; and
        only send for presentation the first object identifier if it is determined that the interaction from the user is received.

4. The non-transitory computer-readable storage medium of claim 1, wherein the notification is at least one of a visual notification, an audible notification, or a haptic notification.

5. The non-transitory computer-readable storage medium of claim 1, wherein the first object identifier includes:
    first information about the first object that is provided by a first entity associated with the first object, wherein the first information is descriptive of the first object.

6. The non-transitory computer-readable storage medium of claim 5, wherein the first object identifier includes:
    second information about the first object that is provided by a second entity associated with the first object; and
    the second information corresponds to an action that may be performed with respect to the first object.

7. The non-transitory computer-readable storage medium of claim 6, wherein the action is at least one of a purchase of the first object, selecting an available size of the first object, or selecting an available color of the first object.

8. The non-transitory computer-readable storage medium of claim 1, wherein the user profile indicates at least one of a user interest of the user, a past purchase history of the user, a past browse history of the user, an identification of items viewed by the user, an identification of items selected by the user, an indication of an object identifier previously viewed by the user, an indication of an object identifier previously saved by the user, or an indication of an object identifier previously shared by the user.

9. The non-transitory computer-readable storage medium of claim 1, wherein the instructions that, when executed by the processor, further cause the processor to at least:
    send, for presentation by the portable device and in conjunction with the first object identifier, at least one action button, wherein the at least one action button, when selected by the user, will cause an action of at least one of directions being sent to the portable device, additional details about the first object being sent to the portable device, a save of the first object identifier, a purchase of the first object, or a share of the first object identifier.

10. The non-transitory computer-readable storage medium of claim 1, wherein the instructions that, when executed by the processor, further cause the processor to at least:
    determine that the user, in response to a presentation of the notification by the wearable device, has expressed an interest in the first object; and
    in response to a determination that the user has expressed an interest, send an alert or a message to the portable device to cause the portable device to present the first object identifier.

11. The non-transitory computer-readable storage medium of claim 1, wherein the instructions that, when executed by the processor, further cause the processor to at least:
    subsequent to the notification being sent to the wearable device and the first object identifier being sent to the portable device:
        determine that the user has moved toward the first object; and
        in response to a determination that the user has moved toward the first object, send for presentation a third object identifier corresponding to the first object, wherein the third object identifier is different than the first object identifier.

12. The non-transitory computer-readable storage medium of claim 1, wherein each of the plurality of second object identifiers is associated with a corresponding second beacon.

13. The non-transitory computer-readable storage medium of claim 1, wherein the instructions that, when executed by the processor, further cause the processor to at least:
    present the notification by the wearable device upon a determination that the location of the portable device is positioned at a location of the first object.

* * * * *